United States Patent
An et al.

(10) Patent No.: US 9,541,405 B2
(45) Date of Patent: Jan. 10, 2017

(54) MOBILE TERMINAL AND CONTROL METHOD FOR THE MOBILE TERMINAL

(71) Applicant: LG ELECTRONICS INC., Seoul (KR)

(72) Inventors: Sooyeon An, Seoul (KR); Jeongeun Shin, Seoul (KR); Seungman Kim, Seoul (KR); Mingoo Kim, Seoul (KR); Kwangjae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/849,660

(22) Filed: Sep. 10, 2015

(65) Prior Publication Data

US 2016/0116292 A1   Apr. 28, 2016

(30) Foreign Application Priority Data

Oct. 23, 2014 (KR) .......... 10-2014-0144360
Oct. 24, 2014 (KR) .......... 10-2014-0145254

(51) Int. Cl.
*G01C 21/26* (2006.01)
*H04W 4/02* (2009.01)
*H04W 4/04* (2009.01)

(52) U.S. Cl.
CPC .......... *G01C 21/26* (2013.01); *H04W 4/021* (2013.01); *H04W 4/025* (2013.01); *H04W 4/046* (2013.01)

(58) Field of Classification Search
CPC .......... B60R 16/037; G06F 19/00
See application file for complete search history.

(56) References Cited

U.S. PATENT DOCUMENTS

| | | | | |
|---|---|---|---|---|
| 5,948,040 A | * | 9/1999 | DeLorme | G01C 21/36 340/990 |
| 8,385,964 B2 | * | 2/2013 | Haney | H04W 12/08 455/404.1 |
| 8,589,069 B1 | | 11/2013 | Lehman | |

(Continued)

FOREIGN PATENT DOCUMENTS

| EP | 2150034 | 2/2010 |
|---|---|---|
| EP | 2665051 | 11/2013 |

(Continued)

OTHER PUBLICATIONS

Extended European Search Report issued in European Application No. 15002196.2 on Mar. 21, 2016, 7 pages.

(Continued)

*Primary Examiner* — Thomas Tarcza
*Assistant Examiner* — Alex C Dunn
(74) *Attorney, Agent, or Firm* — Fish & Richardson P.C.

(57) ABSTRACT

The present disclosure relates to a mobile terminal capable of providing POI information suitable to user environments and a control method thereof, and a mobile terminal according to the embodiments of the present disclosure may include a display unit configured to display map data; and a controller configured to detect user preference information associated with a place from the plurality of communication terminals, detect POI information from a server, detect candidate POI information based on the detected POI information and the user preference information, detect representative POI information from the candidate POI information based on user schedule information, and display the representative POI information on the map data.

21 Claims, 19 Drawing Sheets

(56) References Cited

U.S. PATENT DOCUMENTS

| | | | | |
|---|---|---|---|---|
| 2001/0020211 A1* | 9/2001 | Takayama | ......... | G01C 21/3626 701/410 |
| 2003/0097485 A1* | 5/2003 | Horvitz | ................ | G06F 21/335 719/313 |
| 2004/0128066 A1* | 7/2004 | Kudo | ................ | G01C 21/3617 701/468 |
| 2006/0200309 A1 | 9/2006 | Yu et al. | | |
| 2008/0046298 A1* | 2/2008 | Ben-Yehuda | ........ | G06Q 10/025 705/6 |
| 2012/0254763 A1* | 10/2012 | Protopapas | ....... | G06F 17/30554 715/738 |
| 2014/0309806 A1* | 10/2014 | Ricci | ........................ | B60Q 1/00 701/1 |
| 2014/0309862 A1* | 10/2014 | Ricci | ..................... | G01C 21/00 701/36 |
| 2014/0309863 A1* | 10/2014 | Ricci | ................. | G01C 21/3484 701/36 |

FOREIGN PATENT DOCUMENTS

| | | |
|---|---|---|
| KR | 10-2009-0075284 | 7/2009 |
| KR | 10-2012-0005196 | 1/2012 |
| KR | 10-2014-0029339 | 3/2014 |
| KR | 10-2014-0085789 | 7/2014 |

OTHER PUBLICATIONS

Office Action issued in Korean Application No. 10-2014-0144360 on Nov. 20, 2015, 4 pages.

* cited by examiner

FIG. 14

| | | a(CATEGORY A) | b(CATEGORY B) | c(CATEGORY C) | d(CATEGORY D) | e(CATEGORY E) |
|---|---|---|---|---|---|---|
| USER PREFERENCE LEVEL RECOMMENDATION | | 1 | 2 | 4 | 5 | 3 |
| SERVER RECOMMENDED POI | RATING | 4(4.7/5) | 5(4.3/5) | 3(3/5) | 1(2.7/5) | 2(3.5/5) |
| | DISTANCE | 3(1km) | 5(0.3km) | 2(1.5km) | 1(3km) | 4(0.8km) |
| | PRICE | 5(CHEAP) | 3(STANDARD) | 5(CHEAP) | 3(STANDARD) | 1(EXPENSIVE) |
| | OPEN | 1(OPEN) | 0(CLOSE) | 1(OPEN) | 1(OPEN) | 0(CLOSE) |
| RECOMMENDATION LEVEL | | 13 | 26 | 44 < – RECOMMENDATION | 30 | 21 |

FIG. 19

*VEHICLE DATA BASED POI RECOMMENDATION

| VEHICLE DATA | RECOMMENDED POI |
|---|---|
| VEHICLE ERROR DATA(ENGINE STATUS, TIRE AIR PRESSURE, ENGINE OIL STATUS, AIR CONDITIONING STATUS, COOLANT STATUS, BATTERY VOLTAGE, ETC.) | • RECOMMEND REPAIR SHOP NEAR FROM CURRENT LOCATION |
| FUEL STATUS AND REMAINING FUEL | • RECOMMEND GAS STATION WITHIN DISTANCE OF MILEAGE WITH THE REMAINING FUEL |
| LONG-TERM INSPECTION DATA(PERIODIC INSPECTION PERIOD, SUPPLIES REPLACEMENT PERIOD) | • RECOMMEND REPAIR SHOP NEAR FROM CURRENT LOCATION |
| CAR WASH MANAGEMENT DATA(CAR WASH VISITING PERIOD, ETC.) | • RECOMMEND CAR WASH NEAR FROM CURRENT LOCATION |

FIG. 20

*SHEDULE BASED POI RECOMMENDATION

| SCHEDULE DATA | RECOMMENDED POI |
|---|---|
| TIME OF SCHEDULE EVENT(MEAL TIME) | • RECOMMEND RESTAURANT NEAR FROM SCHEDULE PLACE |
| PLACE OF SCHEDULE EVENT | • RECOMMEND PARKING LOT NEAR FROM SCHEDULE PLACE |
| DISTANCE BETWEEN PLACES OF SCHEDULE EVENT IS FAR | • RECOMMEND PLBLIC TRANSPORTATION NEAR FROM PREVIOUS SCHEDULE PLACE |
| PLACE OF SCHEDULE EVENT(GAS STATION) | • RECOMMEND USER PREFERENCE GAS STATION NEAR FROM SCHEDULE PLACE |
| PLACE OF SCHEDULE EVENT(RESTAIRAMT) | • RECOMMEND COFFEE SHOP NEAR FROM SCHEDULE PLACE |
| PLACE OF SCHEDULE EVENT(HOME) | • RECOMMEND MART NEAR FROM SCHEDULE PLACE |

MOBILE TERMINAL AND CONTROL METHOD FOR THE MOBILE TERMINAL

CROSS-REFERENCE TO RELATED APPLICATION

Pursuant to 35 U.S.C. §119(a), this application claims the benefit of earlier filing date and right of priority to Korean Application Nos. 10-2014-0144360 and 10-2014-0145254, filed on Oct. 23, 2014 and Oct. 24, 2014, respectively, the contents of which is incorporated by reference herein in its entirety.

BACKGROUND OF THE INVENTION

1. Field of the Invention

The present invention relates to a mobile terminal and a method of controlling the same.

2. Background of the Invention

Terminals may be divided into mobile/portable terminals and stationary terminals according to their mobility. Also, the mobile terminals may be classified into handheld terminals and vehicle mount terminals according to whether or not a user can directly carry. As it becomes multifunctional, a mobile terminal can be allowed to capture still images or moving images, play music or video files, play games, receive broadcast and the like, so as to be implemented as an integrated multimedia player.

SUMMARY OF THE INVENTION

An object of the present invention is to provide a mobile terminal and a control method thereof capable of recommending representative POI information based on user preferences of vehicle occupants, recommended POI information of a server, vehicle data and user schedules to provide POI information suitable to user environments.

A mobile terminal according to the embodiments of the present disclosure may include a communication unit configured to form a communication network with a plurality of communication terminals within a vehicle when the mobile terminal is mounted on the vehicle; a display unit configured to display map data; and a controller configured to detect user preference information associated with a place from the plurality of communication terminals, detect POI information from a server through the communication unit, detect candidate POI information based on the detected POI information and the user preference information, detect representative POI information from the candidate POI information based on user schedule information, and display the representative POI information on the map data.

According to an example associated with the present disclosure, the controller may register the representative POI information for the user schedule to update the user schedule, and display the updated user schedule on the display unit or register the updated user schedule with the server.

According to an example associated with the present disclosure, the controller may detect the representative POI information from the candidate POI information based on vehicle data, and display the representative POI information on the map data.

According to an example associated with the present disclosure, the controller may register the representative POI information for the user schedule based on the vehicle data to update the user schedule.

According to an example associated with the present disclosure, the controller may give priority to the user schedule and the vehicle data, and provide the representative POI information detected based on the vehicle data or the representative POI information detected based on the user schedule according to the given priority.

According to an example associated with the present disclosure, the controller may display a time line in an adjoining region of the map data, and display icons indicating the user schedule containing the representative POI information on the time line according to a time sequence.

According to an example associated with the present disclosure, when a first POI icon among the plurality of POI icons displayed on the map data moves into a first time region of the time line by a user input, the controller may register POI information corresponding to the first POI icon for a time corresponding to the first time region on the user schedule.

According to an example associated with the present disclosure, when a first icon displayed in the first time region of the time line among icons indicating the user schedule displayed in a sequence on the time line moves into a second time region of the time line, the controller may change a time for the user schedule corresponding to the first icon to the second time region.

A mobile terminal according to the embodiments of the present disclosure may include a display unit configured to display map data and a time line; and a controller configured to display icons indicating a user schedule containing POI information on the time line in a time sequence.

A method of controlling a mobile terminal according to the embodiments of the present disclosure may include forming a communication network with a plurality of communication terminals within a vehicle when the mobile terminal is mounted on the vehicle; displaying map data on the display unit; detecting user preference information associated with a place from the plurality of communication terminals, and detecting POI information from a server through the communication unit; detecting candidate POI information based on the detected POI information and the user preference information; and detecting representative POI information from the candidate POI information based on user schedule information, and displaying the representative POI information on the map data.

A mobile terminal and a control method according to an embodiment of the present disclosure may automatically switch the mode of the mobile terminal to a vehicle mode when a user carries the mobile terminal and then mounts it on a vehicle, thereby allowing the user to check the vehicle mode in an easy and fast manner A mobile terminal and a control method according to an embodiment of the present disclosure may automatically switch the mode of the mobile terminal to a vehicle mode, and recommend representative POI information based on user preferences of vehicle occupants, recommended POI information of a server when a user carries the mobile terminal and then mounts it on a vehicle, vehicle data and user schedules, thereby providing POI information suitable to user environments.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 14 is an example table illustrating a method of calculating a recommendation level (recommendation score) according to an embodiment of the present disclosure;

FIG. 19 is an exemplary view illustrating a table for recommending POI based on vehicle data according to the embodiments of the present disclosure;

FIG. 20 is an exemplary view illustrating a table for recommending POI based on schedule data according to the embodiments of the present disclosure;

DETAILED DESCRIPTION OF THE INVENTION

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

The exemplary embodiments of the present invention will now be described with reference to the accompanying drawings, in which similar numbers refer to similar elements throughout.

Also, in describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Figure 1:
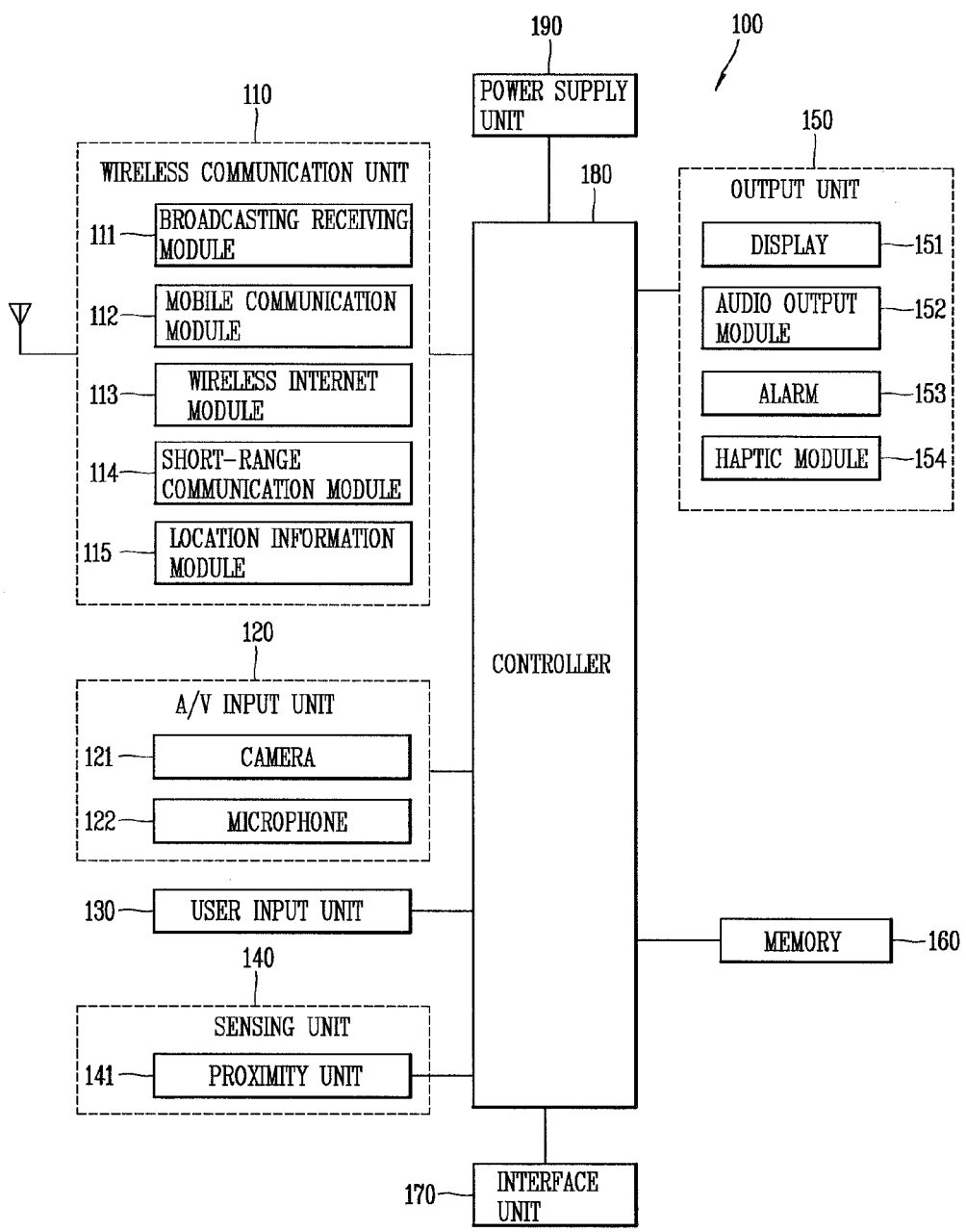
FIG. 1 is a block diagram illustrating the configuration of a mobile communication terminal for explaining the embodiments of the present disclosure.

FIG. 1 is a view illustrating a configuration of a mobile communication terminal 100 according to embodiments of the present invention. The mobile communication terminal (i.e., a cellular phone or a mobile phone) 100 may be implemented in various forms such as mobile phones, smart phones, notebook computers, digital broadcast terminals, PDAs (Personal Digital Assistants), PMPs (Portable Multimedia Player), etc.

As illustrated in FIG. 1, the mobile communication terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile communication terminal 100 having various components, but it is understood that implementing all of the illustrated components is not a requirement. The mobile communication terminal 100 may be implemented by greater or fewer components.

The wireless communication unit 110 typically includes one or more components allowing radio communication between the mobile communication terminal 100 and a wireless communication system or a network in which the mobile communication terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or another type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the terminal. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal (when the mobile communication terminal is located in a vehicle, the location of the vehicle can be checked). For example, the location information module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile communication terminal according to trigonometry on the basis of the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi position system and/or a hybrid positioning system may be used.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capturing device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile communication terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile communication terminal The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile communication terminal 100 such as an opened or closed state of the mobile communication terminal 100, a location of the mobile communication terminal 100, the presence or absence of user contact with the mobile communication terminal 100 (i.e., touch inputs), the orientation of the mobile communication terminal 100, an acceleration or deceleration movement and direction of the mobile communication terminal 100, etc., and generates commands or signals for controlling the operation of the mobile communication terminal 100. For example, when the mobile communication terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile communication terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip (or other element with memory or storage capabilities) that stores various information for authenticating user's authority for using the mobile communication terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile communication terminal 100 or may be used to transfer data within the mobile communication terminal to an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile terminal 100 may include two or more display units (or other display means) according to its particular desired embodiment. For example, the mobile terminal may include both an external display unit (not shown) and an internal display unit (not shown).

When the display unit 151 and the touch pad are overlaid in a layered manner to form a touch screen, the display unit 151 may function as both an input device and an output device. The touch sensor may have the form of, for example, a touch film, a touch sheet, a touch pad, and the like.

The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input position and a touch input area. When there is a touch input with respect to the touch sensor, the corresponding signal(s) are sent to a touch controller (not shown). The touch controller processes the signal(s) and transmits corresponding data to the controller 180. Accordingly, the controller 180 can recognize a touched region of the display unit 151.

A proximity sensor 141 may be may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected on the basis of a change in an electric field according to the approach of the pointer. In this case, the touch screen (touch sensor) may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. When a call signal is received or a message is received, the alarm unit 153 may vibrate the mobile terminal through a vibration means. Or, when a key signal is inputted, the alarm unit 153 may vibrate the mobile terminal 100 through a vibration means as a feedback with respect to the key signal input. Through the vibration, the user may recognize the occurrence of an event. A signal for notifying about the occurrence of an event may be output to the display unit 151 or to the voice output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100. The haptic module 154 may be provided to a place which is frequently in contact with the user. For example, the haptic module 154 may be provided to a steering wheel, a gearshift, a lever, a seat, and the like.

The memory 160 may store software programs used for the processing and controlling operations performed by the controller 180, or may temporarily store data (e.g., a map data, phonebook, messages, still images, video, etc.) that are inputted or outputted.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video 110 ports, earphone ports, or the like. Here, the identification module may be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself. For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

The voice recognition module (voice recognition engine) recognizes a voice pronounced by the user and performs a corresponding function according to the recognized voice signal.

A navigation session applied to the mobile terminal 100 displays a route from a point of departure to a destination on map data.

Figure 2:
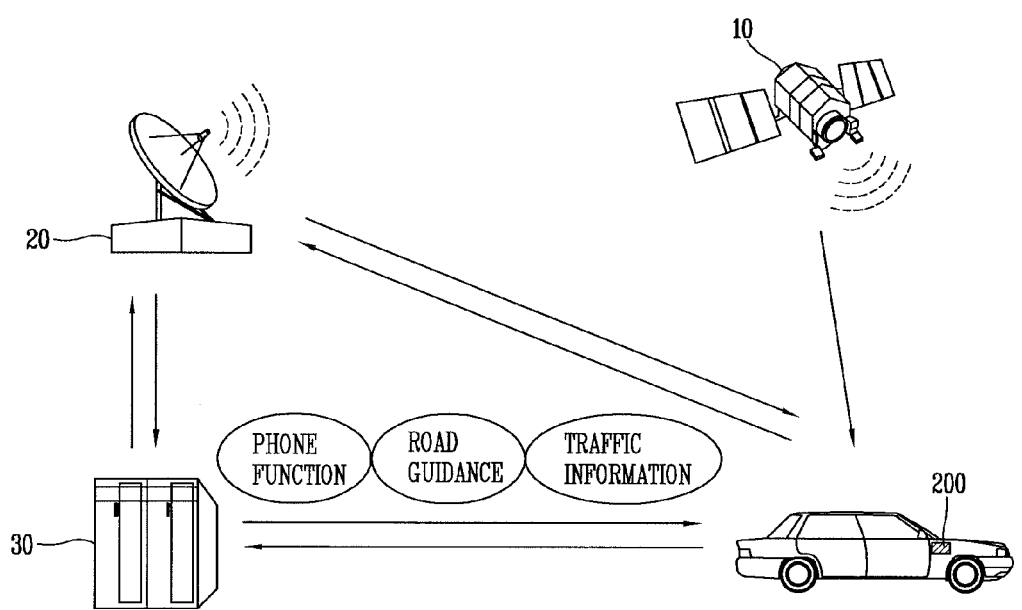
FIG. 2 is a block diagram illustrating a vehicle navigation system according to the embodiments of the present disclosure.

FIG. 2 is a view illustrating a vehicle navigation system according to exemplary embodiments of the present disclosure.

As illustrated in FIG. 2, a vehicle navigation system includes an information providing center (server) 30 providing traffic information and various types of data (e.g. a program, an execution file, and the like); and a telematics terminal 200 mounted within a vehicle, receiving traffic information through a wide area wireless communication network 20 and/or a local area wireless communication network, and providing a road guidance service on the basis of an artificial satellite 10. Here, the communication network may further include a wired/wireless communication network such as a local area network (LAN) or a wide area network (WAN).

Through the communication network, various types of traffic information (e.g., road traffic information, information regarding a point of interest (POI)) including information regarding a traffic light, are collected, and the collected information is processed by an information providing center 30 (e.g., a server) according to a TPEG (Transport Protocol Expert Group) standard and transmitted to a broadcast station. Then, the broadcast station inserts the traffic information including the information regarding a traffic light into a broadcast signal and broadcasts the same to the telematics terminal 200 of the vehicle. The information providing center 30 (for example, a server) may transmit the traffic information to the telematics terminal 200 of the vehicle through the communication network.

The server reconfigures various types of traffic information, which are collected through various paths connected to the communication network, for example, according to an operator input, through the wired/wireless Internet, from digital broadcast services such as a TDC (Transparent Data Channel) or a MOC (Multimedia Object Transport), from a different server, or from a probe car, into a traffic information format such as a format in conformity with a TPEG (Transport Protocol Expert Group) standard, namely, for example, a standard for a traffic information service, and transmits the same to the broadcast station or the telematics terminal 200.

The server may generate a traffic information format on the basis of the TPEG standard including traffic light information, and transmit the same to the broadcast station. The traffic information may include traffic light information and may also include information regarding various traffic conditions required for vehicle driving in roads, sea traffic, airline flights, such as accidents, a road situation, traffic congestion, road construction, road blockage (or road closure), a public transportation network delay, air transportation holdup, and the like.

The broadcast station receives the processed traffic information including traffic light information from the server and transmits it through digital signals in conformity with various digital broadcast standards to the vehicle 200. In this case, the broadcast standards include a European digital audio broadcasting (DAB) standard on the basis of Eureca-147 [ETSI EN 300 401], a terrestrial or satellite digital multimedia broadcasting (DMB) standard, a terrestrial digital video broadcasting (DVB-T) standard, a mobile digital video broadcasting-handheld (DVB-H) standard, media forward link only (MFLO) standard, and the like.

Also, the broadcast station may transmit the traffic information including the traffic light information through a wired/wireless network such as the wired/wireless Internet.

The telematics terminal 200 receives traffic light information included in the traffic information and transfers the traffic light information to the user through graphics, text, and/or audio.

Hereinafter, the configuration of the telematics terminal 200 installed in a vehicle according to an exemplary embodiment of the present disclosure will be described with reference to FIG. 3.

Figure 3:
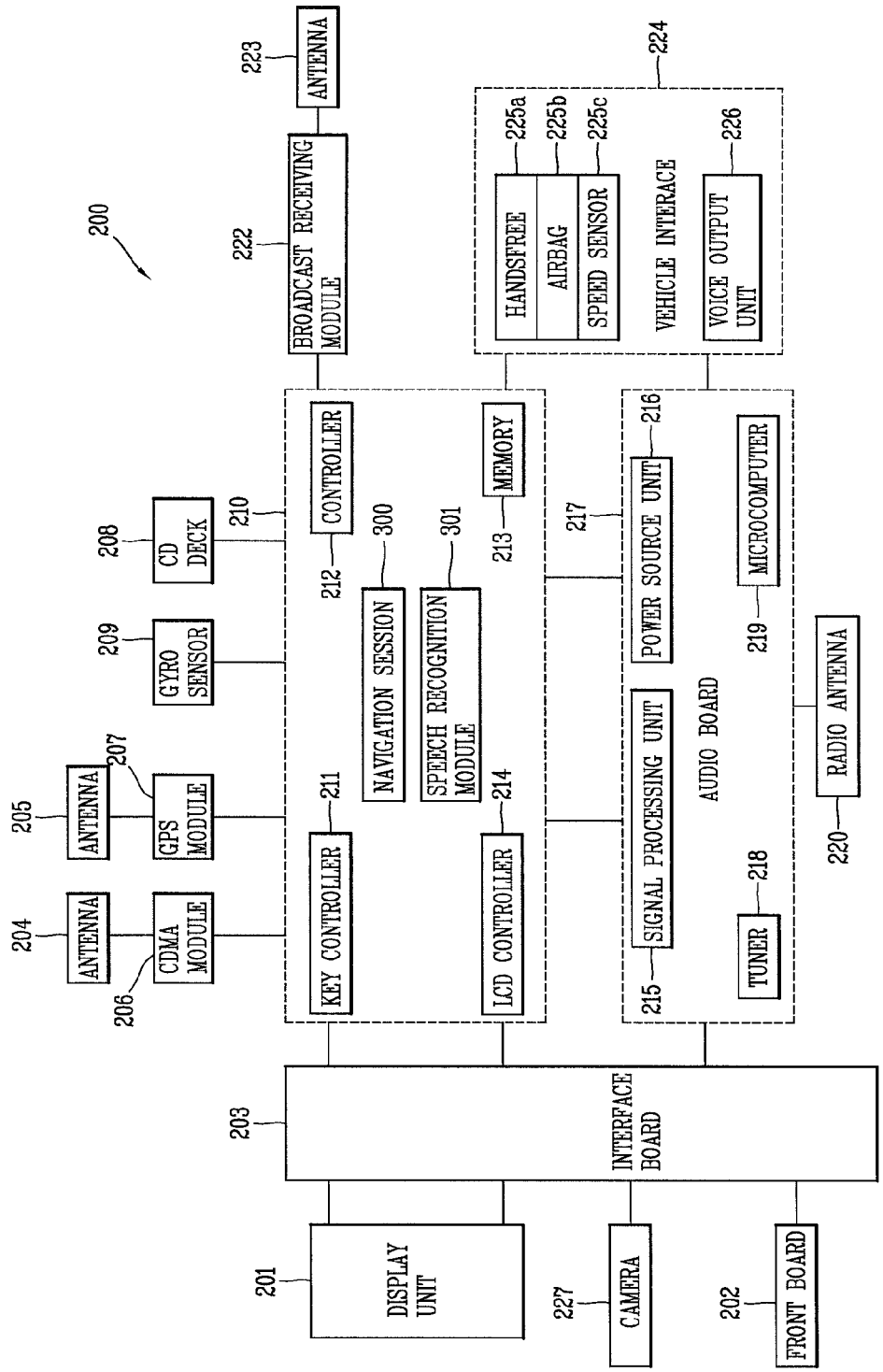
FIG. 3 is a block diagram illustrating the configuration of a telematics terminal for explaining the embodiments of the present disclosure.

FIG. 3 is a schematic block diagram illustrating a configuration of a telematics terminal 200 according to exemplary embodiments of the present disclosure.

As illustrated in FIG. 3, the telematics terminal (or a head unit) 200 includes a main board 210 including a controller (e.g., a central processing unit (CPU)) for controlling the telematics terminal 200 on the whole, a memory 213 for storing various types of information, a key controller 211 for controlling various key signals, and a liquid crystal display (LCD) controller 214 for controlling an LCD.

The memory 213 stores map information (map data) for displaying road guidance information on a digital map. Also, the memory 213 stores a traffic information collecting control algorithm for inputting traffic information according to the situation of a road in which the vehicle currently travels (runs), and information for controlling the algorithm The telematics terminal (or head unit) 200 includes a communication unit 206 including a short-range communication unit (for example, Bluetooth™) and a remote communication unit (for example, a code division multiple access (CDMA) communication unit), a global position system (GPS) module 207 for guiding a location of the vehicle, receiving a GPS signal for tracking a travel route from a start point to a destination, or transmitting traffic information collected by the user, as a GPS signal, a CD deck 208 for reproducing a signal recorded in a CD (Compact Disk), a gyro sensor 209, and the like.

The communication unit 206 and the GPS module 207 may transmit and receive signals through antennas 204 and 205.

A broadcast receiving module 222 is connected with the main board 210 and receives a broadcast signal via an antenna 223. A display unit (i.e., an LCD) 201 under the control of the LCD controller 214, a front board 202 under the control of the key controller 211, and a camera 227 for capturing the interior and/or the exterior of a vehicle are connected to the main board 210 via an interface board 203. The display unit 201 displays various video signals and character signals, and the front board 202 includes buttons for various key signal inputs and provides a key signal corresponding to a button selected by the user to the main board 210. Also, the display unit 201 includes a proximity sensor and a touch sensor (touch screen) of FIG. 2.

The front board 202 includes a menu key for directly inputting traffic information. The menu key may be configured to be controlled by the key controller 211.

An audio board 217 is connected with the main board 210 and processes various audio signals. The audio board 217 includes a microcomputer 219 for controlling the audio board 217, a tuner 218 for receiving a radio signal, a power source unit 216 for supplying power to the microcomputer 219, and a signal processing unit 215 for processing various voice signals.

The audio board 217 also includes a radio antenna 220 for receiving a radio signal and a tape deck 221 for reproducing an audio tape. The audio board 217 may further include a voice output unit (e.g., an amplifier) 226 for outputting a voice signal processed by the audio board 217.

The voice output unit (amplifier) 226 is connected to a vehicle interface 224. Namely, the audio board 217 and the main board 210 are connected to the vehicle interface 224. A handsfree 225a for inputting a voice signal, an airbag 225b configured for the security of a passenger, a speed sensor 225c for detecting a speed of the vehicle, and the like, may be connected to the vehicle interface 224. The speed sensor 225c calculates a vehicle speed and provides the calculated vehicle speed information to the CPU.

The navigation session 300 applied to the telematics terminal 200 generates road guidance information on the basis of the map data and current location information of the vehicle and provides the generated road guidance information to a user.

The display unit 201 detects a proximity touch within a display window via a proximity sensor. For example, when a pointer (e.g., user's finger or a stylus) is proximity-touched, the display unit 201 detects the position of the proximity touch and outputs position information corresponding to the detected position to the controller 212.

A voice recognition module (or a voice recognition engine) 301 recognizes a voice pronounced by the user and performs a corresponding function according to the recognized voice signal.

The navigation session 300 applied to the telematics terminal 200 displays a travel route on map data, and when the location of the mobile terminal 100 is within a pre-set distance from a blind spot included in the travel route, the navigation session 300 automatically forms a wireless network with a terminal mounted in an adjacent vehicle (e.g., a vehicle navigation device) and/or a mobile communication terminal carried by a nearby pedestrian through wireless communication (e.g., a short-range wireless communication network), to receive location information of the adjacent vehicle from the terminal mounted in the adjacent vehicle and receive location information of the nearby pedestrian from the mobile communication terminal carried by the nearby pedestrian.

Figure 4:
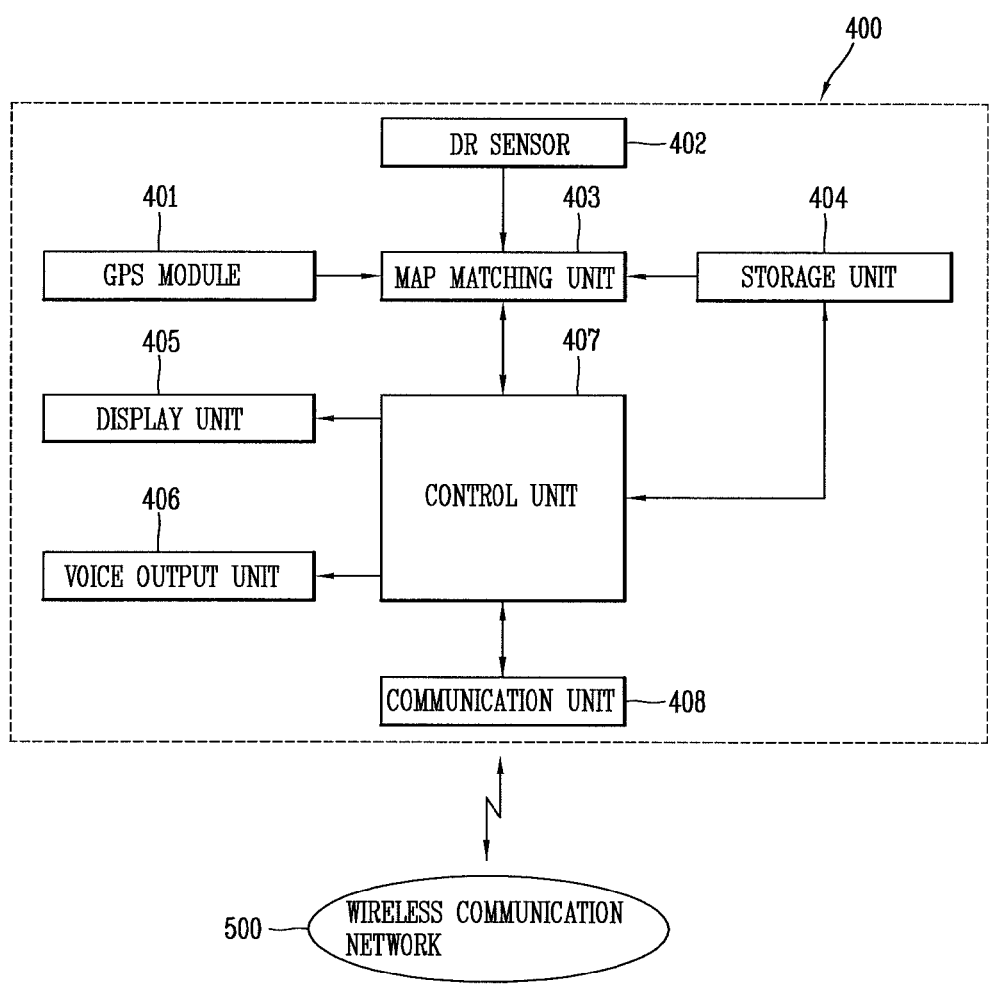
FIG. 4 is a block diagram illustrating the configuration of a navigation (vehicle navigation) device for explaining the embodiments of the present disclosure.

FIG. 4 is a block diagram illustrating a configuration of a navigation (vehicle navigation) device 400 according to embodiments of the present invention.

The navigation (vehicle navigation) device 400 is categorized into an in-dash type and an on-dash type according to an installation type in the vehicle 200. The in-dash type navigation (vehicle navigation) device is insertion-fixed to a predetermined space allocated to a dash board of the vehicle 200. The on-dash type navigation (vehicle navigation) device is mounted on a dash board of the vehicle 200, or is installed near the dash board by using a predetermined supporting plate. Since the on-dash type navigation (vehicle navigation) device is detachably mounted, it may be separated from the vehicle 200 for portability.

The navigation (vehicle navigation) device 400 according to embodiments of the present invention includes not only the in-dash type and the on-dash type, but also an information processing device which can receive and/or process traffic information, e.g., various types of portable terminals which perform a navigation function by interworking with a GPS receiver for receiving a navigation message from a global positioning system (GPS) satellite in the vehicle 200.

As shown in FIG. 4, the navigation device 400 includes a GPS module 401 configured to receive a global positioning system (GPS) signal from a satellite, and configured to generate first vehicle position of the navigation device 400 (regarded to have the same position as the telematics terminal 200 or the mobile communication terminal 100) based on the received GPS signal; a dead-reckoning (DR) sensor 402 configured to generate second vehicle position data based on a driving direction of a vehicle and a speed of the vehicle; a storage unit (or memory) 404 configured to store therein map data and various information; a map matching unit 403 configured to generate a vehicle estimation position based on the first vehicle position data and the second vehicle position data, to match the generated vehicle estimation position with a link (a map matching link or a map matching road) included in the map data stored in the storage unit 404, and to output the matched map information (map matching result); a communication unit 408 configured to receive real-time traffic information from an information providing center and/or a nearby vehicle, through a wireless communication network 420, to receive traffic light information, and to perform a call; a controller 407 configured to generate road guidance information based on the matched map information (map matching result); a display unit 405 configured to display a road guidance map (including information on points of interest (POI)) and the traffic light information; and a voice output unit 406 configured to output road guidance voice information (road guidance voice message) included in the road guidance information, and a voice signal corresponding to the traffic light information.

The communication unit 408 further includes a hands-free device having a Bluetooth module, and may receive a broadcasting signal including traffic information of a TPEG format from a broadcasting station through an antenna. The broadcasting signal includes video and audio data according to various standards such as terrestrial or satellite digital multimedia broadcasting (DMB), digital audio broadcasting (DAB) and digital video broadcasting (DVB-T, DVB-H), but also additional information such as traffic information for traffic information (TPEG) service and data information for binary format for scene (BIFS) service, and various types of additional data. Also, the communication unit 408 tunes a signal bandwidth to which traffic information is provided, demodulates the tuned signal, and outputs the demodulated signal to a TPEG decoder included in the controller 407.

The TPEG decoder decodes traffic information of a TPEG format, and provides, to the controller 407, various types of information such as traffic light information included in the traffic information.

The road guidance information may include not only map data, but also various types of information related to driving, such as lane information, driving limit speed information, turn-by-turn information, traffic safety information, traffic guidance information, vehicle information, and road search information.

A signal received through the GPS module 401, may provide position information of the mobile terminal to the navigation device 400, through wireless communication technology such as 802.11, 802.15, 802.16 and 802.20. IEEE 802.11 is a set of specifications for implementing wireless local area network (WLAN) computer communication proposed by the Institute of Electrical and Electronics Engineers (IEEE) LAN/MAN standards committee. IEEE 802.15 is a working group of the Institute of Electrical and Electronics Engineers (IEEE) IEEE 802 standards committee which specifies wireless personal area network (WPAN) standards such as Bluetooth, UWB and Zigbee. IEEE 802.16 is a series of wireless broadband standards written by the Institute of Electrical and Electronics Engineers (IEEE), standards for wireless metropolitan area network broadband wireless access (MAN BWA) such as metropolitan broadband networks (fixed wireless access: FWA). IEEE 802.20 or Mobile Broadband Wireless Access (MBWA) is a specification by the standard association of the Institute of Electrical and Electronics Engineers (IEEE) for mobile wireless Internet access networks such as Wibro and WiMAX.

The navigation device 400 may further include an input unit. The input unit, configured to select a user's desired function or to input information, may be implemented as a keypad, a touch screen, a jog shuttle, a microphone, etc.

The map matching unit 403 is configured to generate a vehicle estimation position based on the first position data and the second position data, and reads map data corresponding to a driving path, from the storage unit 404.

The map matching unit 403 is configured to match the vehicle estimation position with links (roads) included in the map data, and to output the matched map information (map matching result) to the controller 407. For instance, the map matching unit 403 generates a vehicle estimation position based on the first position data and the second position data, and matches the generated vehicle estimation position with links included in the map data stored in the storage unit 404, in order of links. Then, the map matching unit 403 outputs the matched map information (map matching result) to the controller 407. The map matching unit 403 may output, to the controller 407, road attribute information included in the matched map information (map matching result), such as a single-story road or a double-story road. The function of the map matching unit 403 may be executed by the controller 407.

The storage unit 404 is configured to store map data therein. The map data includes geographic coordinates indicating a latitude and a longitude in the unit of degree/minute/second (DMS). The map data may include universal transverse Mercator (UTM) coordinates, universal polar system (UPS) coordinates, transverse Mercator (TM) coordinates, etc., as well as the geographic coordinates.

The storage unit 404 stores therein various types of menu screens, points of interest (POIs), and various types of information such as function characteristic information according to a specific position of map data.

The storage unit 404 stores therein various user interfaces (UIs) and/or graphic user interfaces (GUIs).

The storage unit 404 stores therein data, programs, etc. required to operate the navigation device 400.

The storage unit 404 stores therein destination information input by a user through the input unit. The destination information may indicate either a destination, or a starting point and a destination.

The display unit 405 displays video information (or a road guidance map) included in road guidance information generated by the controller 407. The display unit 405 includes a touch sensor (touch screen) and a proximity sensor. The road guidance information may include not only map data, but also various types of information related to driving, such as lane information, driving limit speed information, turn-by-turn information, traffic safety information, traffic guidance information, vehicle information, and road search information.

When displaying the video information, the display unit 405 may display various menu screens and various content such as road guidance information, by using a user interface and/or a graphic user interface included in the storage unit 404. The content displayed on the display unit 405 includes various texts or image data (including map data or various types of information data), a menu screen including data such as icons, a list menu and a combo box, and so on.

The voice output unit 406 outputs voice information included in road guidance information generated by the controller 407, or a voice message with respect to the road guidance information. The voice output unit 406 may be implemented as an amplifier or a speaker.

The controller 407 generates road guidance information based on the matched map information, and outputs the generated road guidance information to the display unit 405 and the voice output unit 406. The display unit 405 displays the road guidance information.

The controller 407 generates road guidance information by receiving real-time traffic information from the information providing center and/or a terminal mounted to a peripheral vehicle (vehicle navigation device).

The controller 407 may perform a call by being connected to a call center through the communication unit 408, or may transmit/receive information between the navigation device 400 and the call center. The communication unit 408 further includes a hands-free module having a Bluetooth function using a short-range wireless communication method.

Once a POI search menu is selected by a user, the controller 407 searches for POIs positioned on a path from a current position to a destination, and displays the searched POIs on the display unit 405. The controller 407 searches for a POI positioned on the path (i.e., a point searched without change (research) of the path, e.g., a POI positioned on the left or right side of a road) and/or a POI positioned near the path (i.e., a point searched after change of the path, e.g., a point searched after change of a preset path so as to pass through a nearby POI), and displays the searched POI(s) on the display unit 405.

Hereinafter, a mobile terminal which is detachably mountable to a dash board of a vehicle will be explained with reference to FIG. 5.

Figure 5:
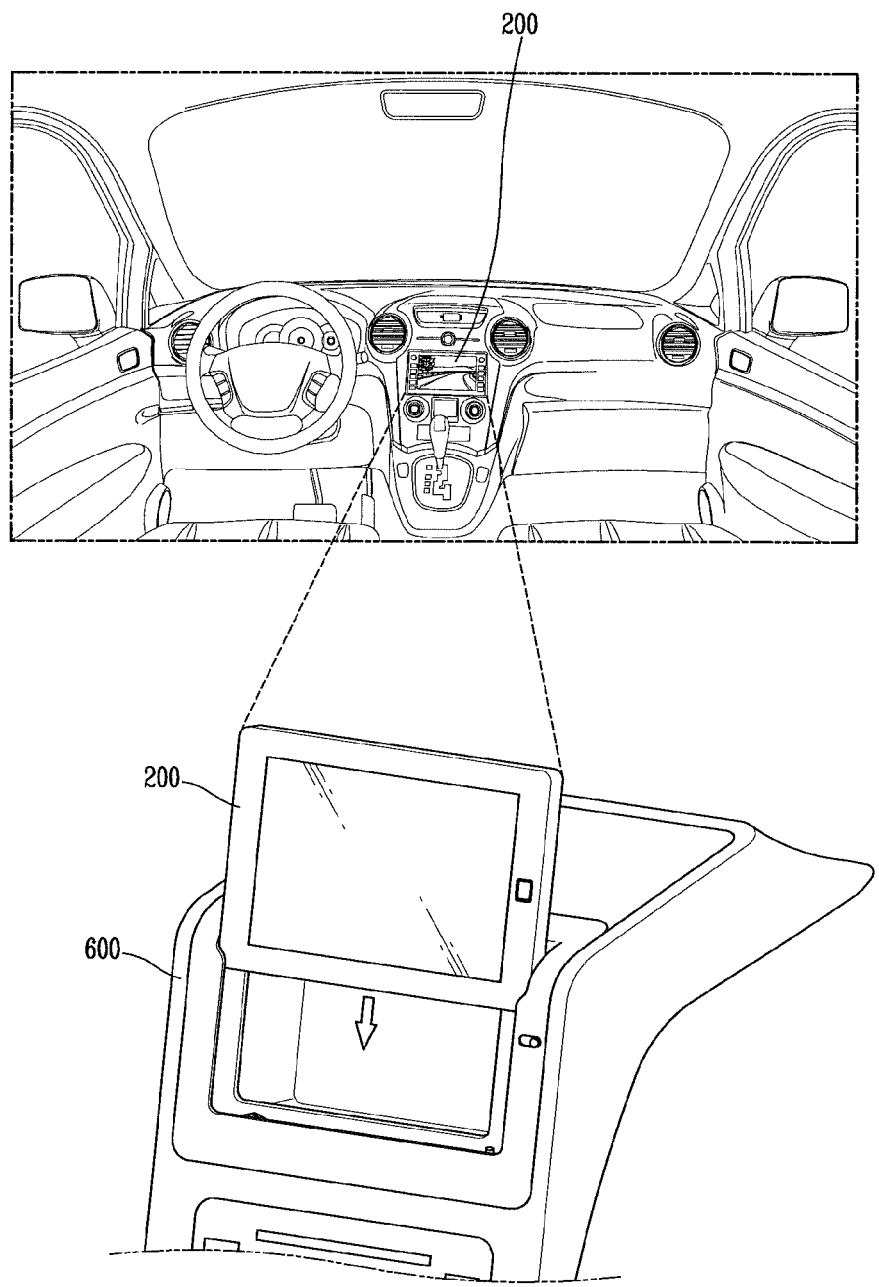
FIG. 5 is an exemplary view illustrating a mobile terminal which is mountable on or detachable from a vehicle according to the embodiments of the present disclosure

FIG. 5 is an exemplary view of a mobile terminal which is mountable/detachable to/from a vehicle according to embodiments of the present invention.

As shown in FIG. 5, the mobile terminal may be the mobile communication terminal 100 or the telematics terminal 200. As the telematics terminal 200, a notebook computer, a tablet personal computer (PC), etc. may be used. Hereinafter, the present invention will be explained in an assumption that the telematics terminal 200 (e.g., tablet PC) is the mobile terminal.

The mobile terminal 200 is mountable or detachable to/from a dash board 600 of a vehicle. Once the mobile terminal 200 is mounted to the dash board 600 of the vehicle, a general mode of the mobile terminal 200 is automatically converted into a vehicle mode (vehicle screen mode), and a plurality of content inside the mobile terminal are displayed on the display unit 201 of the mobile terminal 200 under restrictions on vehicle driving. When mounted to the dash board 600 of the vehicle, the mobile terminal 200 is connected to an electronic controller (ECU) of the vehicle.

Figure 6:
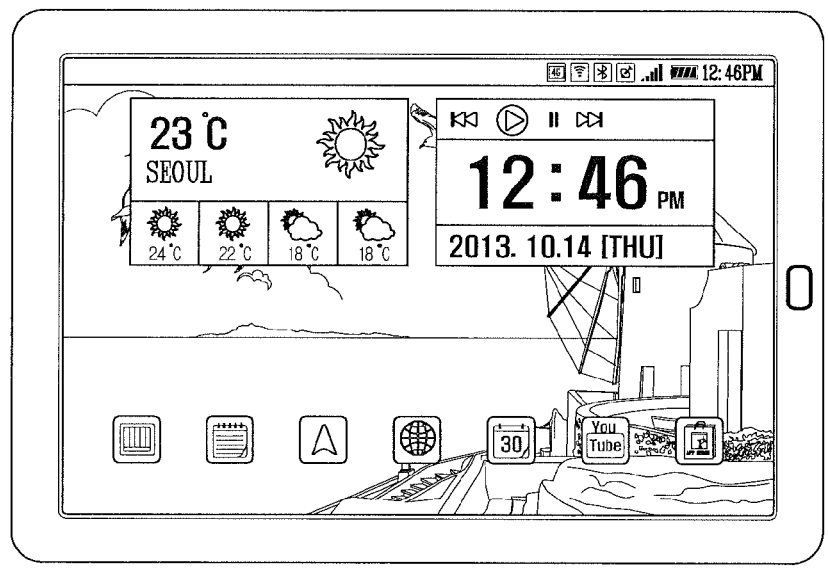
FIG. 6 is an exemplary view illustrating a general mode of a mobile terminal.

FIG. 6 is an exemplary view illustrating a general mode of a mobile terminal.

As shown in FIG. 6, the mobile terminal 200 displays various content (icons of application programs) on a screen regardless of vehicle restrictions in a general mode, and executes the content according to a user's request. If a navigation application program is executed by a user in a general mode, the mobile terminal 100 displays pedestrian navigation information not vehicle navigation information, on the screen.

In the vehicle mode (vehicle screen mode), the mobile terminal 200 receives vehicle information from the vehicle, synchronizes the received vehicle information with personal information and mobile information of a server, and displays the synchronized information. When detached from the vehicle, the mobile terminal 200 automatically converts the vehicle mode into the general mode, and records information on a driving record of the vehicle.

Hereinafter, a method of controlling the mobile terminal according to embodiments of the present invention will be explained.

Firstly, the controller 212 determines whether the mobile terminal 200 has been mounted to the vehicle. For instance, once the mobile terminal 200 is connected to an electronic controller (ECU) of the vehicle through a wired or wireless communication network, the controller 212 determines that the mobile terminal 200 has been mounted to the vehicle.

The mobile terminal 200 may further include a sensing unit (not shown) configured to sense a connected state of the mobile terminal 200 with the vehicle. For instance, the sensing unit may sense whether the mobile terminal 200 has been connected to the electronic controller (ECU) of the vehicle, or a port of the ECU of the vehicle, and may output a sensing signal to the controller 212 to thus generate a notification signal indicating that the mobile terminal 100 has been connected to the vehicle. Then, the mobile terminal 200 may display the notification signal on the display unit 151. The sensing unit (not shown), configured to sense a connected state between the mobile terminal 200 and the vehicle, may be operated automatically or manually.

Once the mobile terminal 200 is mounted to the vehicle, the controller 212 may display navigation data (map data) installed in the mobile terminal 200, on the display unit 201.

Once the mobile terminal 200 is mounted to the vehicle, the controller 212 receives pre-registered identification information on a vehicle driver (e.g., universally unique identifier, UUID) from the ECU of the vehicle.

The controller 212 authenticates the mobile terminal 200, based on the pre-registered identification information on a vehicle driver (e.g., universally unique identifier, UUID) received from the ECU of the vehicle, and identification information registered to the memory 213 (e.g., universally unique identifier, UUID). For instance, if the received pre-registered identification information on a vehicle driver matches the identification information registered to the memory 213, the controller 212 allows information exchange between the mobile terminal 200 and the ECU of the vehicle.

The controller 212 may authenticate the mobile terminal 200 based on the pre-registered identification information on a vehicle driver, the identification information registered to the memory 213, and personal information pre-registered to a server (e.g., an ID and a password registered by a user of the mobile terminal).

Once the mobile terminal 200 is authenticated, the controller 212 receives vehicle information from the ECU of the vehicle. The vehicle information may include information on conditioning equipment of the vehicle (e.g., temperature level information of a heater or an air conditioner), engine oil amount information, engine temperature information, tire pneumatic pressure information, battery information, radio channel setting information, information on a current speed of the vehicle, information on revolution per minute (RPM) of the vehicle, information on a steering angle of the vehicle, information on driving a brake of the vehicle, etc.

The controller 212 detects content corresponding to personal information among a plurality of content of the mobile terminal. The content corresponding to personal information may include a schedule application program (scheduler), a social networking service (SNS) application program (Facebook, Kakao talk, Twitter, Youtube, etc.), an email application program, a phone book application program, a moving image application program, etc. The content corresponding to personal information may further include a media application program.

The controller 212 implements a vehicle mode (vehicle screen mode), based on the content corresponding to personal information among a plurality of content of the mobile terminal, vehicle information and navigation information. Then, the controller 212 displays the vehicle mode on the display unit 201. The content corresponding to personal information may be synchronized with a server and/or a user's cellular phone.

Figure 7:
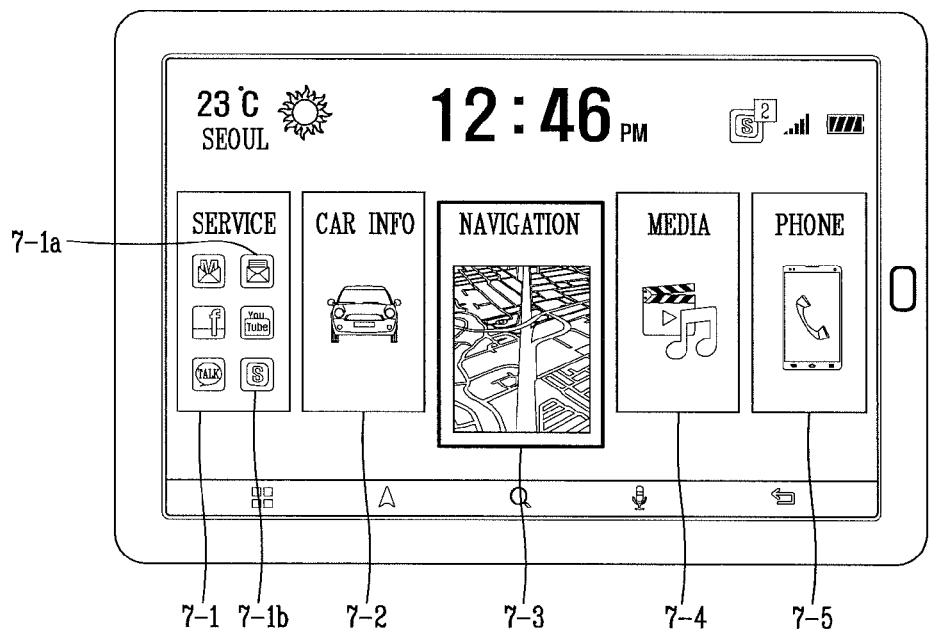
FIG. 7 is an exemplary view illustrating a vehicle mode displayed on a mobile terminal according to the embodiments of the present disclosure.

FIG. 7 is an exemplary view illustrating a vehicle mode displayed on a mobile terminal according to embodiments of the present invention.

As shown in FIG. 7, the vehicle mode (vehicle screen mode) includes a first region 7-1 for displaying content corresponding to personal information among a plurality of content of the mobile terminal, a second region 7-2 for displaying vehicle information, and a third region 7-3 for displaying navigation information indicating a path from a current position to a destination.

The vehicle mode (vehicle screen mode) may further include a fourth region 7-4 for displaying media data (e.g., film, music video, drama, etc.), and a fifth region 7-5 for displaying an icon for a call. Once the icon for a call is selected by a user, the controller 212 performs a call.

If an email icon 7-1a is selected from the first region 7-1 for displaying content corresponding to personal information among a plurality of content of the mobile terminal, the controller 212 executes an application program corresponding to the selected email icon 7-1a, thereby displaying email content on the first region 7-1. If the email icon 7-1a is selected when the vehicle is running, the controller 212 converts email content corresponding to the selected email icon 7-1a into a voice signal, and outputs the voice signal through the voice output unit 226.

If a schedule icon 7-1b is selected from the first region 7-1 for displaying content corresponding to personal information, the controller 212 executes an application program corresponding to the selected schedule icon 7-1b, thereby displaying schedule content on the first region 7-1. If the schedule icon 7-1b is selected when the vehicle is running, the controller 212 converts schedule content corresponding to the selected schedule icon 7-1b into a voice signal, and outputs the voice signal through the voice output unit 226.

If the second region 7-2 for displaying vehicle information is selected, the controller 212 may display at least one of information on conditioning equipment of the vehicle (e.g., temperature level information of a heater or an air conditioner), engine oil amount information, engine temperature information, tire pneumatic pressure information, battery information, radio channel setting information, etc., on the second region 7-2 or an entire region of the display unit 201.

In the mobile terminal and the method of controlling the same according to the present invention, when a user mounts the mobile ten final to the vehicle, a general mode of the mobile terminal is automatically converted into a vehicle mode. This can allow the user to check the vehicle mode rapidly and easily.

In the mobile terminal and the method of controlling the same according to the present invention, when a user mounts the mobile terminal to the vehicle, a vehicle mode (vehicle screen mode) is displayed based on the content corresponding to personal information among a plurality of content of the mobile terminal, vehicle information and navigation information. This can allow the user to check a personal vehicle mode.

In the mobile terminal and the method of controlling the same according to the present invention, when a user mounts a mobile terminal to a vehicle, a vehicle mode (vehicle screen mode) is displayed based on the content corresponding to personal information among a plurality of content of the mobile terminal, vehicle information and navigation information. Further, when the vehicle is running, the content corresponding to personal information among a plurality of content of the mobile terminal in the vehicle mode is changed under restrictions on vehicle driving, and then is output. This can allow a driver of the vehicle to drive safely.

Figure 8:
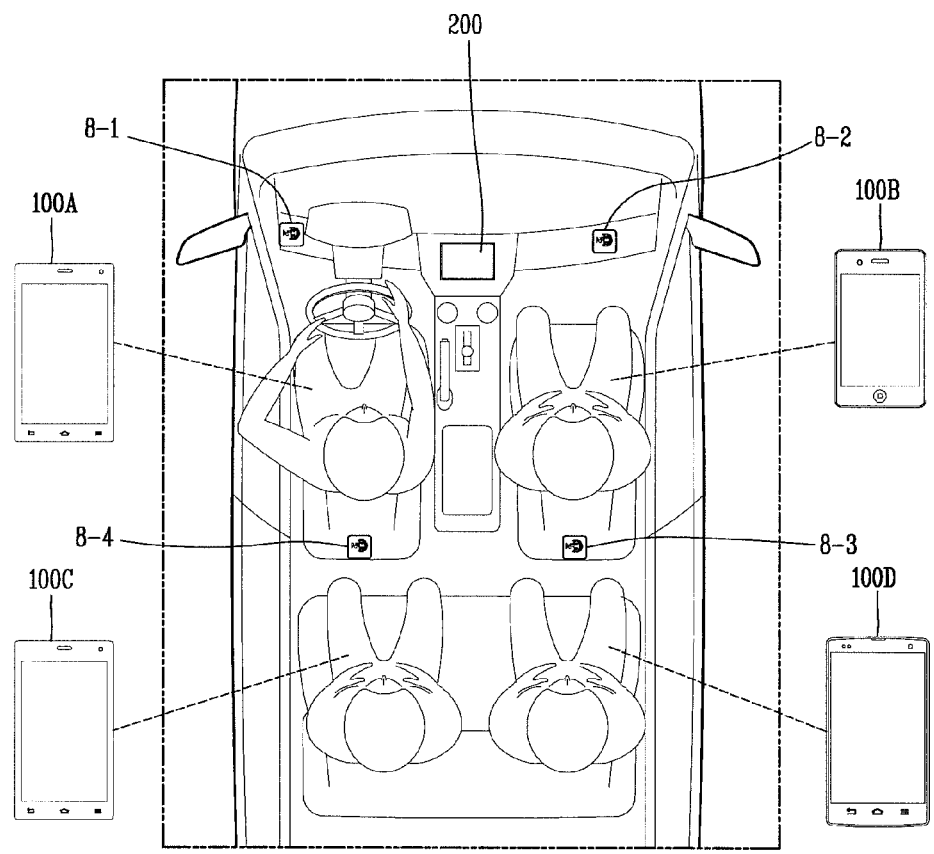
FIG. 8 is an exemplary view illustrating a plurality of terminals interworking with each other within a vehicle according to the embodiments of the present disclosure.

FIG. 8 is an exemplary view illustrating a plurality of terminals interworking with each other in a vehicle according to embodiments of the present invention.

As shown in FIG. 8, the plurality of terminals may include a telematics terminal (or a head unit) 200 mounted to a vehicle, and a plurality of mobile communication terminals 100A, 100B, 100C, and 100D. The plurality of terminals may be connected to each other through a wireless or wired communication network. The telematics terminal 200 may be used by a vehicle driver, and the plurality of mobile communication terminals 100 may be used by vehicle passenger(s).

Instead of the telematics terminal 200, a navigation device or the mobile communication terminal 100 may be used. Instead of the plurality of mobile communication terminals 100, a plurality of rear seat entertainment systems (RSEs), a plurality of cellular phones, a plurality of smartphones, a plurality of notebook computers, a plurality of digital broadcasting terminals, a plurality of personal digital assistants (PDAs), a plurality of portable multimedia players (PMPs), a plurality of tablet personal computers (PCs), and the like, may also be used. Hereinafter, the telematics terminal 200 and one or more mobile communication terminals 100 will be described as an example.

The telematics terminal 200 interworks with a plurality of terminals within a vehicle and easily, and rapidly receives an application program desired by a user from the plurality of terminals and execute the received application program, thereby effectively using information (for example, an application program, content, data, and the like) stored in each of the plurality of terminals.

The mobile communication terminal 100 interworks with the telematics terminal 200 within the vehicle and other mobile communication terminals within the vehicle, easily and rapidly receives an application program desired by a user from the telematics terminal 200 and the other mobile communication terminals, and executes the received application program, thereby effectively using information (for example, an application program, content, data, and the like) stored in each of the plurality of terminals.

That is, since the plurality of terminals may exchange mutual information with each other within the vehicle, only an apparatus and a method thereof will be explained. In the apparatus and the method, the telematics terminal 200 interworks with a plurality of terminals within a vehicle and an application program desired by a user is easily and rapidly received from the plurality of terminals and executed, so that the user can easily and effectively use information (for example, an application program, content, data, and the like) stored in each of the plurality of terminals.

As illustrated in FIG. 8, the information providing apparatus according to exemplary embodiments of the present invention may further include a position information generating unit configured to generate current position information of a plurality of mobile communication terminals within a vehicle. The position information generating unit may include a first near field communication (NFC) (or radio-frequency identification (RFID)) tag 8-1 installed in a driver's seat of the vehicle and generating first position information indicating a position of the driver's seat of the vehicle, a second NFC tag 8-2 installed in a passenger seat of the vehicle and generating second position information indicating a position of the passenger seat of the vehicle, a third NFC tag 8-3 installed in a back seat of the passenger seat of the vehicle and generating third position information indicating a position of the back seat of the passenger seat of the vehicle, and a fourth NFC tag 8-4 installed in a back seat of the driver's seat of the vehicle and generating fourth position information indicating a position of the back seat of the driver's seat of the vehicle.

For example, when a particular mobile communication terminal approaches, the first NFC tag 8-1 transmits the first position information to the particular mobile communication terminal. The particular mobile communication terminal receives the first position information from the first NFC tag 8-1, and transmits identification information of the particular mobile communication terminal together with the received first position information to the controller 240.

When a particular mobile communication terminal approaches, the second NFC tag 8-2 transmits the second position information to the particular mobile communication terminal. The particular mobile communication terminal receives the second position information from the second NFC tag 8-2 and transmits identification information of the particular mobile communication terminal together with the received second position information to the controller 240.

When a particular mobile communication terminal approaches, the third NFC tag 8-3 transmits the third position information to the particular mobile communication terminal. The particular mobile communication terminal receives the third position information from the third NFC tag 8-3 and transmits identification information of the particular mobile communication terminal together with the received third position information to the controller 240.

When a particular mobile communication terminal approaches, the fourth NFC tag 8-4 transmits the fourth position information to the particular mobile communication terminal. The particular mobile communication terminal receives the fourth position information from the fourth NFC tag 8-4 and transmits identification information of the particular mobile communication terminal together with the received fourth position information to the controller 240.

The position information generating unit may include a first USB module installed in a driver's seat of the vehicle and providing first position information indicating a position of the driver's seat of the vehicle to the controller 240, a second USB module installed in a passenger seat of the vehicle and providing second position information indicating a position of the passenger seat of the vehicle to the controller 240, a third USB module installed in a back seat of the passenger seat of the vehicle and providing third position information indicating a position of the back seat of the passenger seat of the vehicle to the controller 240, and a fourth USB module installed in a back seat of the driver's seat of the vehicle and providing fourth position information indicating a position of the back seat of the driver's seat of the vehicle to the controller 240.

The controller 240 may detect position information of a mobile communication terminal within a vehicle on the basis of signals from a plurality of beacons installed within the vehicle. For example, the controller 240 may detect a position of a mobile communication terminal within the vehicle through a triangulation technique using the beacons.

The mobile communication terminal 100 may display an intra-vehicle position setting menu on the display unit 151 according to a user request. The intra-vehicle position setting menu may include a first item indicating a position of a driver's seat, a second item indicating a position of a passenger seat, a third item indicating a position of a back seat of the passenger seat, and a fourth item indicating a position of a back seat of the driver's seat.

When the first item is selected by a user, the mobile communication terminal 100 may generate first position information indicating the position of the driver's seat, and transmits the generated first position information to the controller 240. When the second item is selected by the user, the mobile communication terminal 100 may generate second position information indicating the position of the passenger seat, and transmits the generated second position information to the controller 240. When the third item is selected by the user, the mobile communication terminal 100 may generate third position information indicating the position of the back seat of the passenger seat, and transmits the generated third position information to the controller 240. When the fourth item is selected by the user, the mobile communication terminal 100 may generate fourth position information indicating the position of the back seat of the driver's seat, and transmits the generated fourth position information to the controller 240.

Hereinafter, a method of controlling a mobile terminal according to an embodiment of the present invention will be explained.

Figure 9:
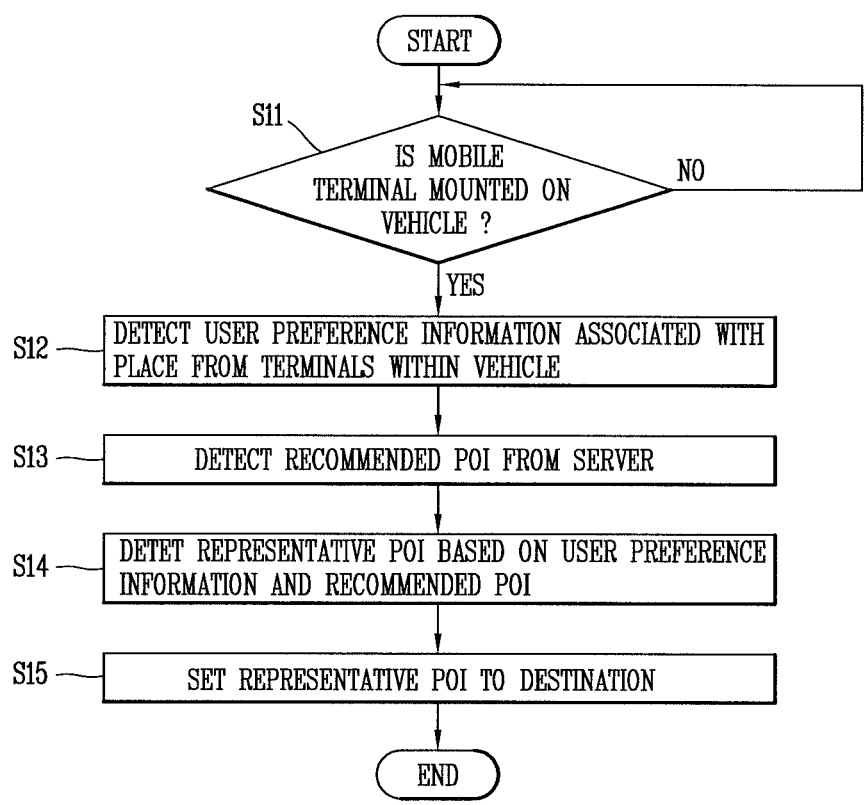
FIG. 9 is a flow chart illustrating a method of controlling a mobile terminal according to an embodiment of the present disclosure.

FIG. 9 is a flow chart illustrating a method of controlling a mobile terminal according to an embodiment of the present invention.

First, the controller 212 determines (judges) whether or not the mobile terminal 200 is mounted on the vehicle (S11). For example, when the mobile terminal 200 is connected to an electronic control unit (ECU) of the vehicle through a wired or wireless communication network within the vehicle, the controller 212 determines that the mobile terminal 200 is mounted on the vehicle (for example, a dashboard of the vehicle).

When the mobile terminal 200 is mounted on the vehicle, the controller 212 may display navigation data (map data) installed in the mobile terminal 200 on the display unit 201. When the mobile terminal 200 is mounted on the vehicle, the controller 212 forms a communication network with a plurality of mobile communication terminals 100A, 100B, 100C, 100D within the vehicle.

When the mobile terminal 200 is mounted on the vehicle, the controller 212 detects user preference information associated with a place from the plurality of mobile communication terminals 100A, 100B, 100C, 100D within the vehicle (S12). For example, the controller 212 detects a recent destination, a navigation or Internet search destination, a visiting place, a place (destination) registered with the Favorites on the Internet stored in a plurality of mobile communication terminals 100A, 100B, 100C, 100D, respectively, within the vehicle as user preference information associated with the place. The user preference information associated with the place may further include a place in connection with a user taste (for example, a food taste (Chinese, Japanese, Korean, etc.) of the plurality of mobile communication terminals 100A, 100B, 100C, 100D, respectively, and hobby activity information (for example, golf, bowling, shopping, etc.).

The controller 212 may classify the user preference information according to POI categories. For example, the controller 212 may classify information associated with a department store as first POI information, classify information associated with a gas station as second POI information, classify information associated with a restaurant as third POI information, and classify information associated with a tourist attraction as fourth POI information among user preference information associated with the place.

The controller 212 may apply a weighted value corresponding to a use frequency of the information associated with the department store to the first POI information, apply a weighted value corresponding to a use frequency of the information associated with the gas station to the second POI information, apply a weighted value corresponding to a use frequency of the information associated with the restaurant to the third POI information, and apply a weighted value corresponding to a use frequency of the information associated with the tourist attraction to the fourth POI information among user preference information associated with the place. Accordingly, the first through the fourth POI information may have a different weighted value due to a user preference (taste) of the plurality of mobile communication terminals 100A, 100B, 100C, 100D, respectively.

The controller 212 may display user preference information associated with the place on the plurality of mobile communication terminals 100A, 100B, 100C, 100D as well as on the display unit 201.

When the mobile terminal 200 is mounted on the vehicle, the controller 212 detects recommendation POI information from a server (S13). For example, when the mobile terminal 200 is mounted on the vehicle, the controller 212 requests recommendation POI information contained within a predetermined radius from a current location to a server, and receives the recommendation POI information from the server. The predetermined radius may be changed by a user. The recommendation POI information detected from the server may be POI information recommended by a social network service (SNS) (for example, Facebook, KakaoTalk, Twitter, YouTube, etc.), a portal site, and the like.

The controller 212 detects representative POI information based on the user preference information and recommendation POI information associated with the place (S14). For example, the controller 212 detects POI information corresponding to the user preference information as the representative POI information. The representative POI information may include at least one or more POIs.

The controller 212 detects POI information corresponding to the user preference information among the recommendation POI information, and arrange the detected POI information according to a weighted value applied to the user preference information. For example, the controller 212 may detect POI information corresponding to the user preference information among the recommendation POI information, and arrange the detected POI information in the order from a high weighted value to a low weighted value applied to the user preference information.

The controller 212 may display the representative POI information on the display unit 201, and set any one of the representative POI information to a destination according to a user's request (S15). The controller 212 may display the representative POI information on the display unit 201 when the vehicle is being stopped.

The controller 212 may give a destination setting authority to any one of the plurality of mobile communication terminals 100A, 100B, 100C, 100D.

The controller 212 may share private driving data with the plurality of mobile communication terminals 100A, 100B, 100C, 100D.

The controller 212 may display the representative POI information on the plurality of mobile communication terminals 100A, 100B, 100C, 100D as well as on the display unit 201. The controller 212 may set a POI selected from the representative POI information displayed on the plurality of mobile communication terminals 100A, 100B, 100C, 100D as a stopover on a route from a current location to a destination. For example, the controller 212 may display the representative POI information on the display unit 201, and automatically set a POI selected from the representative POI information displayed on the plurality of mobile communication terminals 100A, 100B, 100C, 100D in a state that any one of the representative POI information is set to a destination according to a user's request as a stopover on a route from a current location to the destination.

The controller 212 may display the representative POI information on the display unit 201 and the plurality of mobile communication terminals 100A, 100B, 100C, 100D as well as display information (for example, department store opening hours, department store products information, restaurant opening hours, restaurant menus information, gas station oil prices, tourist attractions information, etc.) associated with the representative POI information (for example, department store, restaurant, gas station, tourist attraction, etc.) on the display unit 201 and the plurality of mobile communication terminals 100A, 100B, 100C, 100D.

The controller 212 may detect user preference scores for a plurality of POI information, respectively, generated by classifying the user preference infoiiiiation according to POI categories and a sum of user recommendation scores for the detected POI information as a POI recommendation level (POI recommendation score), and automatically set POI information having the highest POI recommendation score (recommendation level) among the plurality of POI information and the recommended POI information to a destination. The user preference score may be the same as the weighted value.

Hereinafter, a method of displaying icons indicating POI information according to the POI recommendation score (recommendation level) will be described with reference to FIG. 10. For example, the controller 212 may detect user preference scores for a plurality of POI information, respectively, generated by classifying the user preference information according to POI categories and a sum of user recommendation scores for the detected POI information as a POI recommendation level (POI recommendation score), and display icons indicating the plurality of POI information and the recommendation POI information according to the POI recommendation score (recommendation level).

Figure 10:
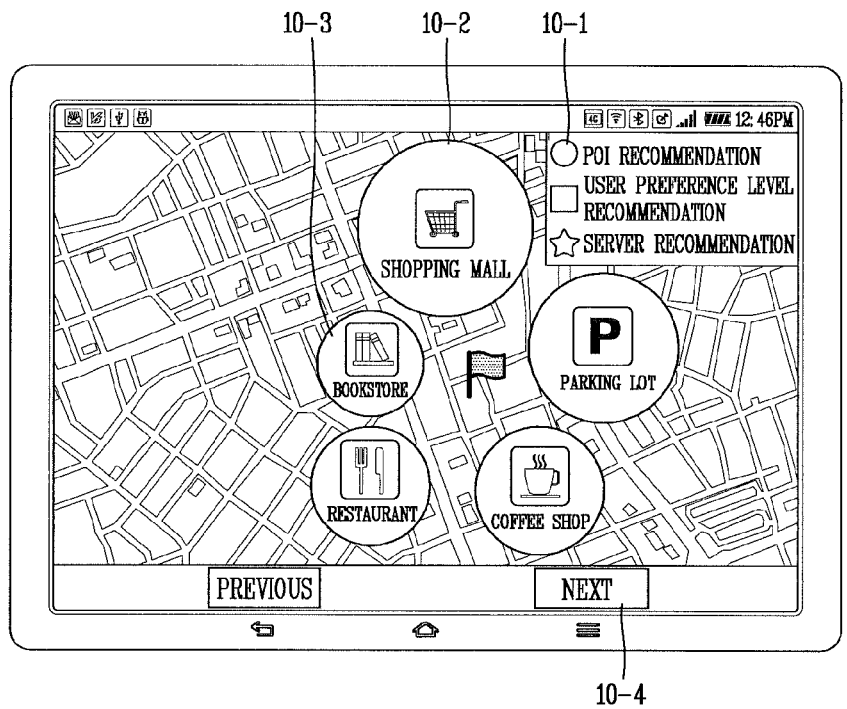
FIG. 10 is an exemplary view illustrating a method of displaying icons indicating POI information according to the POI recommendation score (recommendation level) according to an embodiment of the present disclosure.

FIG. 10 is an exemplary view illustrating a method of displaying icons indicating POI information according to the POI recommendation score (recommendation level) according to an embodiment of the present disclosure.

As illustrated in FIG. 10, when a menu 10-1 for displaying POI information according to the POI recommendation score (recommendation level) is selected by a user, the controller 212 detects POI information within the predetermined radius from a current location among the plurality of POI information and the recommendation POI information, and displays icons indicating the detected POI information on the map data according to the POI recommendation score (recommendation level) in a different manner For example, the controller 212 may display the size of an icon 10-2 indicating POI information having a high POI recommendation score (recommendation level) among the icons indicating POI information within the predetermined radius from the current location in a size larger than that of an icon 10-3 indicating POI information having a lower POI recommendation score (recommendation level). The controller 212 may display the background of icons indicating POI information with a different color according to the POI recommendation score (recommendation level). The controller 212 may set the sharpness or transparency of icons indicating POI information according to the POI recommendation score (recommendation level) in a different manner The controller 212 may display a predetermined number of POI information (for example, the first to fifth highest POI recommendation scores) in the order of the highest POI recommendation score (recommendation level) on the map data when a menu 10-1 for displaying POI information according to the POI recommendation score (recommendation level) is selected by a user, and display POI information from the sixth to tenth highest POI recommendation scores on the map data when a "Next" 10-4 button is selected by the user.

When any one of the first to fifth POI recommendation scores is selected by a user, the controller 212 may automatically set the selected POI as a destination.

When a number of POI information are selected by a user from the plurality of POI information displayed on the display unit, the controller 212 may display information (for example, department store opening hours, department store products information, restaurant opening hours, restaurant menus information, gas station oil prices, tourist attractions information, etc.) associated with the number of POI information on the display unit.

Figure 11:
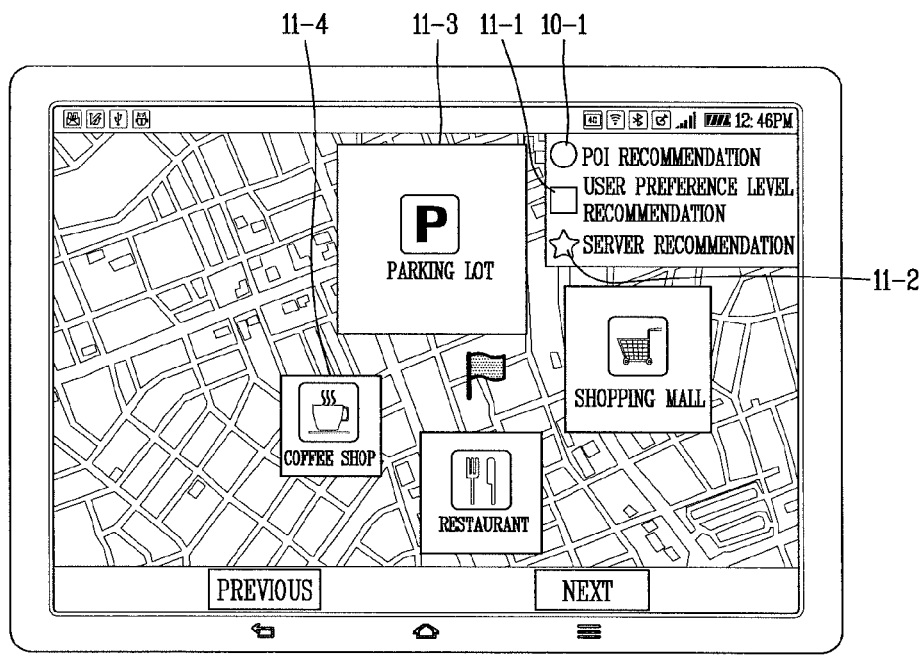
FIG. 11 is an exemplary view illustrating another method of indicating POI information according to the POI recommendation score (recommendation level) according to an embodiment of the present disclosure.

FIG. 11 is an exemplary view illustrating another method of indicating POI information according to the POI recommendation score (recommendation level) according to an embodiment of the present disclosure.

As illustrated in FIG. 11, when a menu 11-1 for displaying POI information according to the user preference score is selected by a user, the controller 212 detects POI information within the predetermined radius from a current location among the plurality of POI information, and displays icons indicating the detected POI information on the map data according to the user preference score in a different manner. For example, the controller 212 may display the size of an icon 11-3 indicating POI information having a high user preference score (user preference level) among the icons indicating POI information within the predetermined radius from the current location in a size larger than that of an icon 11-4 indicating POI information having a lower user preference score (user preference level). The controller 212 may display the background of icons indicating POI information with a different color according to the user preference score (user preference level). The controller 212 may set the sharpness or transparency of icons indicating POI information according to the user preference score (user preference level) in a different manner The controller 212 may display a predetermined number of POI information (for example, the first to fifth highest user preference scores) in the order of the highest user preference score (user preference level) on the map data when a menu 11-1 for displaying POI information according to the user preference score (user preference level) is selected by a user, and display POI information from the sixth to tenth highest user preference scores on the map data when a "Next" button is selected by the user.

When any one of the first to fifth user preference scores is selected by a user, the controller 212 may automatically set the selected POI as a destination.

When a menu 11-2 for displaying POI information according to the user recommendation score (for example, SNS user's recommendation score) is selected by a user, the controller 212 detects POI information within the predetermined radius from a current location among the recommendation POI information, and displays icons indicating the detected POI information on the map data according to the user recommendation score in a different manner. For example, the controller 212 may display the size of an icon indicating POI information having a high user recommendation score among the icons indicating POI information within the predetermined radius from the current location in a size larger than that of an icon indicating POI information having a lower user recommendation score. The controller 212 may display the background of icons indicating POI information with a different color according to the user recommendation score. The controller 212 may set the sharpness or transparency of icons indicating POI information according to the user recommendation score in a different manner.

The controller 212 may display a predetermined number of POI information (for example, the first to fifth highest user recommendation scores) in the order of the highest user recommendation score on the map data when a menu 11-2 for displaying POI information according to the user recommendation score is selected by a user, and display POI information from the sixth to tenth highest user recommendation scores on the map data when a "Next" button is selected by the user.

When any one of the first to fifth user recommendation scores is selected by a user, the controller 212 may automatically set the selected POI as a destination.

Figure 12:
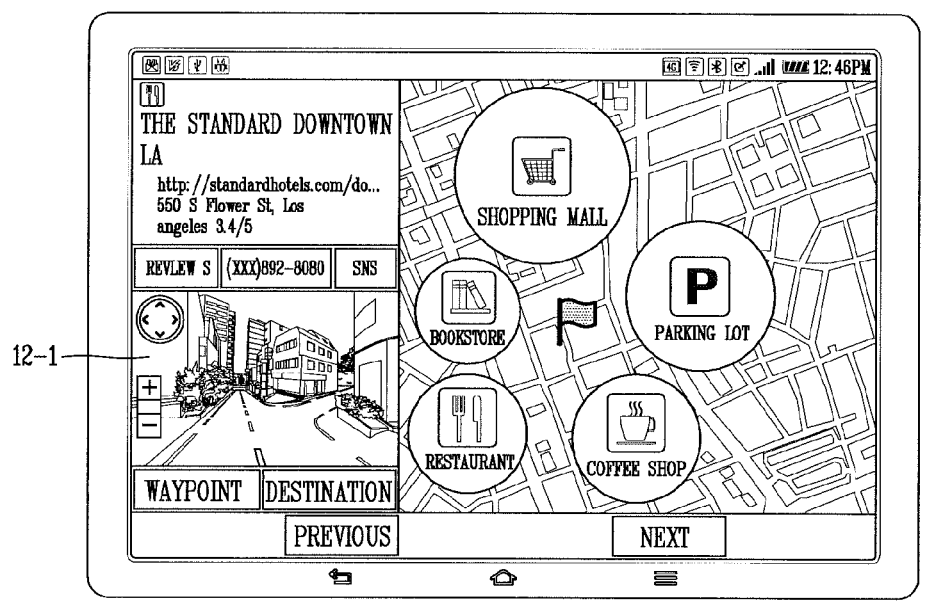
FIG. 12 is an exemplary view illustrating information associated with POI information according to an embodiment of the present disclosure.

FIG. 12 is an exemplary view illustrating information associated with POI information according to an embodiment of the present disclosure.

As illustrated in FIG. 12, the controller 212 may display icons indicating the POI information (for example, department store, restaurant, gas station, tourist attraction, etc.) on the map data in a different manner according to the POI recommendation score (recommendation level), and then when any one of icons indicating the POI information is selected by a user, the controller 212 may display information (department store opening hours, department store products information, restaurant opening hours, restaurant menus information, gas station oil prices, tourist attractions information, etc.) 12-1 associated with the selected POI information at one or more of the left side, the right side, the top and the bottom of the map data. The controller 212 may display the location of the POI information (for example, department store, restaurant, gas station, tourist attraction, etc.) on the map data as a marker.

Information associated with the selected POI information may include a cloud user rating (for example, a rating based on quality, service quality, satisfaction level, price, etc.) for the relevant POI. The information associated with the selected POI information may further include additional information such as a call function, review information, SNS posting, a photo, street view information, and the like for the relevant POI.

Figure 13A:
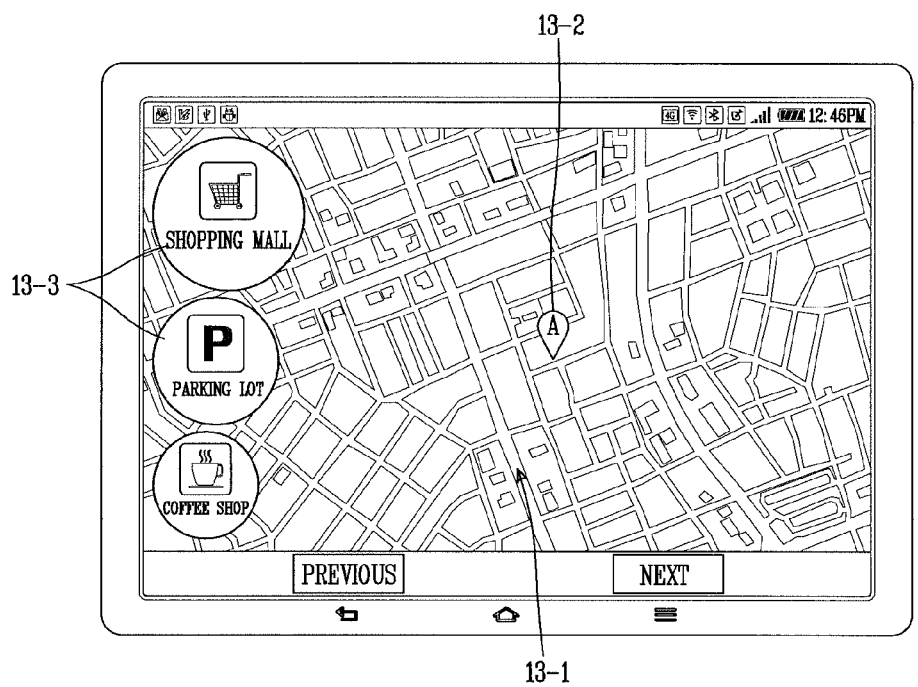
FIG. 13A is an exemplary view illustrating a method of displaying POI information when a vehicle is moving according to an embodiment of the present disclosure.

FIG. 13A is an exemplary view illustrating a method of displaying POI information when a vehicle is moving according to an embodiment of the present disclosure.

As illustrated in FIG. 13A, the controller 212 may display icons 13-3 indicating POI information (for example, department store, restaurant, gas station, tourist attraction, etc.) based on the POI recommendation score (recommendation level) according to the POI recommendation score (recommendation level) while the vehicle is being stopped, and then display icons 13-3 indicating the POI information at one or more of the left side, the right side, the top and the bottom of the map data when the vehicle is moving. For example, when the vehicle is moving, the controller 212 may display icons 13-3 indicating the POI information at one or more of the left side, the right side, the top and the bottom of the map data not to hide a route from a current location 13-1 to a destination 13-2 from the icons 13-3 indicating the POI information.

The controller 212 may display icons 13-3 indicating POI information (for example, department store, restaurant, gas station, tourist attraction, etc.) based on the POI recommendation score (recommendation level) according to the POI recommendation score (recommendation level) while the vehicle is being stopped, and then display icons 13-3 indicating the POI information (for example, department store, restaurant, gas station, tourist attraction, etc.) displayed at the relevant location of the map data on at least one or more of the plurality of mobile communication terminals 100A, 100B, 100C, 100D when the vehicle is moving.

Figure 13B:
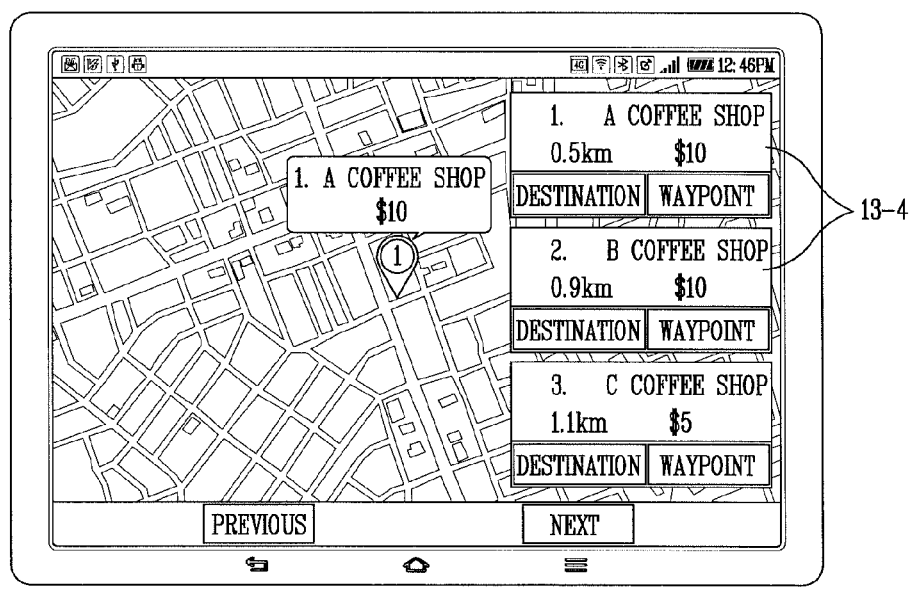
FIG. 13B is an exemplary view illustrating a method of displaying information associated with POI information when a vehicle is moving according to an embodiment of the present disclosure.

FIG. 13B is an exemplary view illustrating a method of displaying information associated with POI information when a vehicle is moving according to an embodiment of the present disclosure.

As illustrated in FIG. 13B, when any one (for example, coffee shop) is selected from icons 13-3 indicating POI information (for example, department store, restaurant, gas station, tourist attraction, etc.) based on the POI recommendation score (recommendation level), the controller 212 may arrange POIs (for example, coffee shop "A", coffee shop "B", coffee shop "C", coffee shop "D", etc.) corresponding to the selected icon (for example, coffee shop) in the order of the nearest distance from a current location, and display the arranged POIs at one or more of the left side, the right side, the top and the bottom of the map data. The controller 212 may display information (for example, coffee price, coffee shop opening hours, etc.) 13-4 associated with the POIs, respectively, corresponding to the selected icon (for example, coffee shop) at one or more of the left side, the right side, the top and the bottom of the map data.

FIG. 14 is an example table illustrating a method of calculating a recommendation level (recommendation score) according to an embodiment of the present disclosure.

As illustrated in FIG. 14, the controller 212 may classify the user preference information according to POI categories to generate a plurality of POI information (for example, category "A", category "B", category "C", category "D", category "E", etc.)

The controller 212 gives a user preference score according to a user frequency of the plurality of POI information (for example, category "A", category "B", category "C", category "D", category "E", etc.) For example, the controller 212 may give user preference score 5 to POI information having the highest use frequency, and give user preference score 1 to POI information having the lowest use frequency among the plurality of POI information (for example, category "A", category "B", category "C", category "D", category "E", etc.), and a range of the user preference scores is between 1 to 5. The range of the user preference scores may not be necessarily limited to this, but may be changed according to the user's or designer's intention.

The controller 212 gives a user recommendation score for recommendation POI information detected from the server. For example, the controller 212 sets a predetermined relative score for the user rating of a POI corresponding to category "A" within recommendation POI information detected from the server (for example, sets a relative score to for the user rating of a POI corresponding to the category "A" to 4 when the user rating of a POI corresponding to the category "A" is 4.7 out of a perfect score of 5). The controller 212 sets a predetermined relative score for the user rating of a POI corresponding to category "D" within recommendation POI information detected from the server (for example, sets a relative score for the user rating of a POI corresponding to the category "D" to 1 when the user rating of a POI corresponding to the category "D" is 2.7 out of a perfect score of 5). In other words, when the user rating for a category within recommendation POI information detected from the server is high, the controller 212 sets a relative score in proportion to this, and when the user rating for a category within recommendation POI information detected from the server is low, the controller 212 sets a relative score in proportion to this. A predetermined relative score for the user rating of the POI may not be necessarily limited to a range between 1 and 5, but may be changed according to the user's or designer's intention.

When the location of a POI corresponding to category "B" within recommendation POI information detected from the server is the nearest from a current location (for example 0.3 km), the controller 212 sets a distance score of the POI for the category "B" to 5. When the location of a POI corresponding to category "D" within recommendation POI information detected from the server is the farthest from a current location (for example 3 km), the controller 212 sets a distance score of the POI for the category "D" to 1. In other words, when the distance of a POI for the category within recommendation POI information detected from the server is near from a current location, the controller 212 sets a high relative score in proportion to this, and when the distance of a POI for the category within recommendation POI information detected from the server is far from a current location, the controller 212 sets a low relative score in proportion to this. A distance score of the POI may not be necessarily limited to a range between 1 and 5, but may be changed according to the user's or designer's intention.

When the product price (a coffee price of coffee shop "A") of a POI (for example, coffee shop "A") corresponding to category "A" within recommendation POI information detected from the server is the lowest, the controller 212 sets a product price score of the POI for the category "A" to 5. When the product price of a POI corresponding to category "E" within recommendation POI information detected from the server is the highest, the controller 212 sets a product price score of the POI for the category "E" to 1. In other words, when the product price of a POI corresponding to the category within recommendation POI information detected from the server is low, the controller 212 sets a high relative score in proportion to this, and when the product price of a POI for the category within recommendation POI information detected from the server is high, the controller 212 sets a low relative score in proportion to this. A product price score of the POI may not be necessarily limited to a range between 1 and 5, but may be changed according to the user's or designer's intention.

When a POI (for example, coffee shop "A") corresponding to category "A" within recommendation POI information detected from the server is open, the controller 212 sets a sales score of the POI for the category "A" to "1". When a POI corresponding to category "B" within recommendation POI information detected from the server is not open (temporarily closed), the controller 212 sets a sales score of the POI for the category "B" to "0". In other words, when a POI corresponding to the category within recommendation POI information detected from the server is open, the controller 212 sets a high relative score in proportion to this, and when a POI corresponding to the category within recommendation POI information detected from the server is not open, the controller 212 sets a low relative score in proportion to this. A sales score of the POI may not be necessarily limited to "0" or "1", but may be changed according to the user's or designer's intention.

The controller 212 may add a user preference score of POI corresponding to each category, a user rating of POI corresponding to each category, a distance score of POI corresponding to each category, a product price score of POI corresponding to each category, and a sales score of POI corresponding to each category, and calculate the added result as the recommendation level (recommendation score).

The controller 212 may add at least one of a user rating of POI corresponding to each category, a distance score of POI corresponding to each category, a product price score of POI corresponding to each category, and a sales score of POI corresponding to each category to a user preference score of POI corresponding to each category, and calculate the added result as the recommendation level (recommendation score).

The controller 212 recommend a POI having the highest recommendation score among the calculated recommendation scores as the representative POI for the user.

The controller 212 may automatically set a POI having the highest recommendation score among the calculated recommendation scores as the destination.

Figure 15:
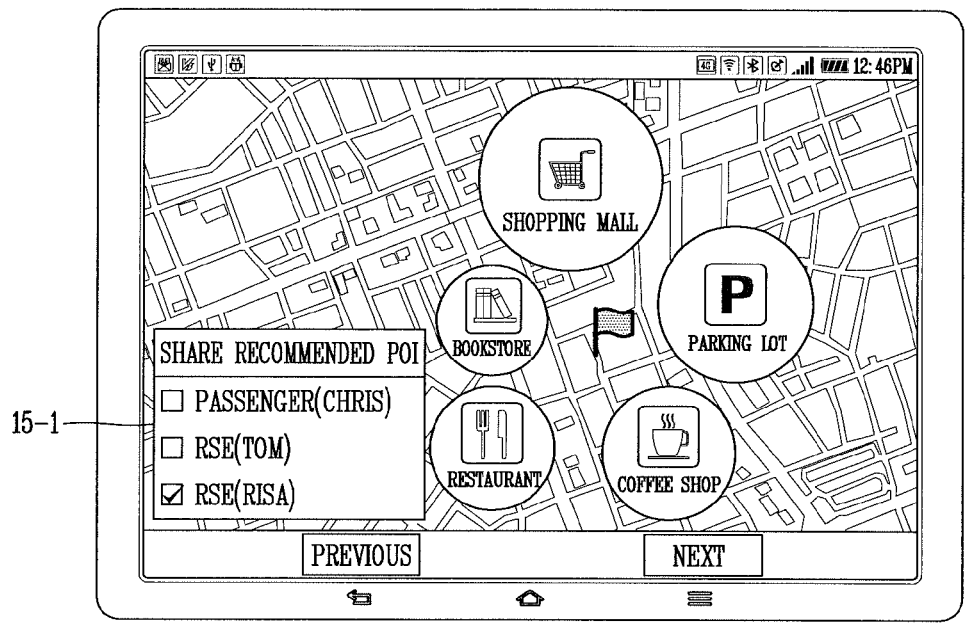
FIG. 15 is an exemplary view illustrating a method of sharing POI information (POI information based on a recommendation level) according to an embodiment of the present disclosure.

FIG. 15 is an exemplary view illustrating a method of sharing POI information (POI information based on a recommendation level) according to an embodiment of the present disclosure.

As illustrated in FIG. 15, when a share menu (or share icon) for sharing POI information according to the POI recommendation score (recommendation level) with a plurality of mobile communication terminals 100A, 100B, 100C, 100D within the vehicle is selected by a user, the controller 212 displays a window (for example, pop-up window) 15-1 for sharing POI information according to the POI recommendation score (recommendation level) on the map data.

The window 15-1 for sharing POI information according to the POI recommendation score (recommendation level) may include a first check box for sharing POI information according to the POI recommendation score (recommendation level) with a first mobile communication terminal (for example, a terminal of the passenger's seat) within the vehicle, and a second and a third check box for sharing POI information according to the POI recommendation score (recommendation level) with a second and a third mobile communication terminal (for example, a terminal (RSE) of the driver's rear seat and a terminal (RSE) of the rear passenger's seat) within the vehicle.

When the first check box is checked by a user, the controller 212 provide POI information according to the POI recommendation score (recommendation level) to a first mobile communication terminal (for example, a terminal of the passenger's seat) within the vehicle to share POI information according to the POI recommendation score (recommendation level) with the first mobile communication terminal (for example, a terminal of the passenger's seat) within the vehicle.

When the second check box is checked by a user, the controller 212 provide POI information according to the POI recommendation score (recommendation level) to a second mobile communication terminal (for example, a terminal (RSE) of the driver's rear seat) within the vehicle to share POI information according to the POI recommendation score (recommendation level) with the second mobile communication terminal within the vehicle.

When the third check box is checked by a user, the controller 212 provide POI information according to the POI recommendation score (recommendation level) to a third mobile communication terminal (for example, a terminal (RSE) of the passenger's rear seat) within the vehicle to share POI information according to the POI recommendation score (recommendation level) with the third mobile communication terminal within the vehicle.

Figure 16:
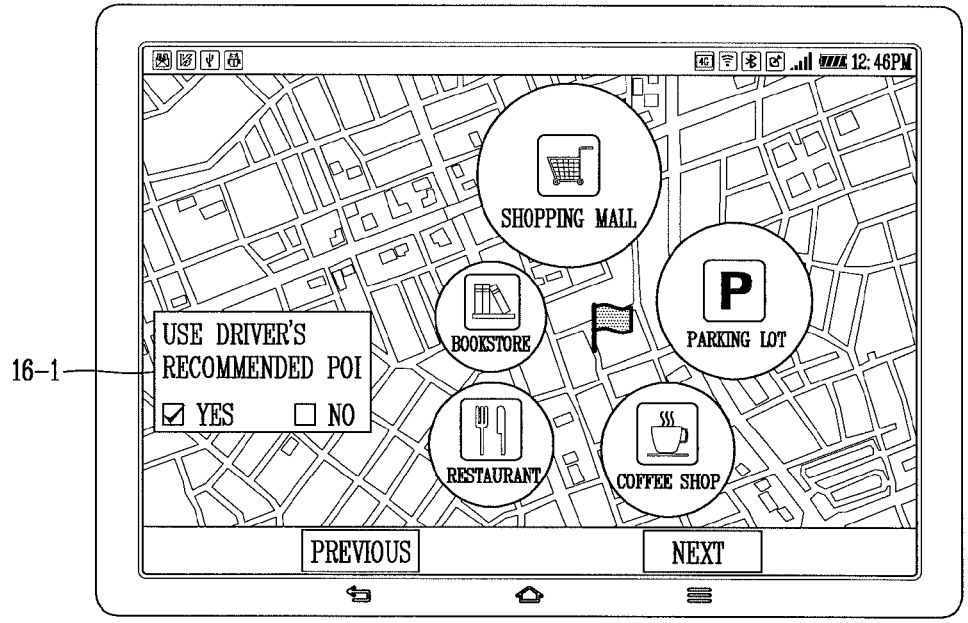
FIG. 16 is an exemplary view illustrating another method of sharing POI information (POI information based on a recommendation level) according to an embodiment of the present disclosure.

FIG. 16 is an exemplary view illustrating another method of sharing POI information (POI information based on a recommendation level) according to an embodiment of the present disclosure.

As illustrated in FIG. 16, when POI information (for example, driver's recommendation POI information) according to the POI recommendation score (recommendation level) is received, the first mobile communication terminal (for example, a terminal of the passenger's seat) within the vehicle may display a window 16-1 for asking whether or not to use POI information according to the POI recommendation score (recommendation level) on the display unit of the first mobile communication terminal (for example, a terminal of the passenger's seat) within the vehicle. In other words, POI information according to the POI recommendation score (recommendation level) may be displayed on the display unit of the first mobile communication terminal (for example, a terminal of the passenger's seat) within the vehicle according to a user input of the first mobile communication terminal (for example, a terminal of the passenger's seat) within the vehicle.

Hereinafter, a method of controlling a mobile terminal according to another embodiment of the present disclosure will be described.

Figure 17:
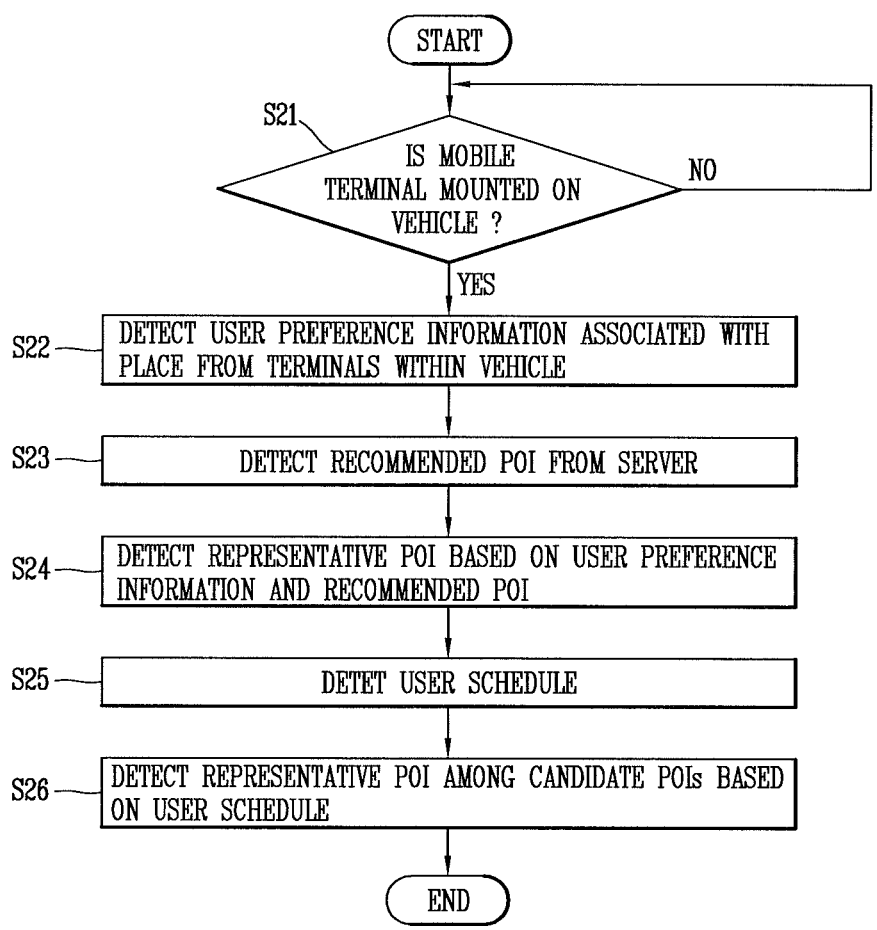
FIG. 17 is a flow chart illustrating a method of controlling a mobile terminal according to another embodiment of the present disclosure.

FIG. 17 is a flow chart illustrating a method of controlling a mobile terminal according to another embodiment of the present disclosure.

First, the controller 212 determines (judges) whether or not the mobile terminal 200 is mounted on the vehicle (S21). For example, when the mobile terminal 200 is connected to an electronic control unit (ECU) of the vehicle through a wired or wireless communication network within the vehicle, the controller 212 determines that the mobile terminal 200 is mounted on the vehicle (for example, a dashboard of the vehicle).

When the mobile terminal 200 is mounted on the vehicle, the controller 212 may display navigation data (map data) installed in the mobile terminal 200 on the display unit 201. When the mobile terminal 200 is mounted on the vehicle, the controller 212 forms a communication network with a plurality of mobile communication terminals 100A, 100B, 100C, 100D within the vehicle.

When the mobile terminal 200 is mounted on the vehicle, the controller 212 detects user preference information associated with a place from the plurality of mobile communication terminals 100A, 100B, 100C, 100D within the vehicle (S22). For example, the controller 212 detects a recent destination, a navigation or Internet search destination, a visiting place, a place (destination) registered with the Favorites on the Internet stored in a plurality of mobile communication terminals 100A, 100B, 100C, 100D, respectively, within the vehicle as user preference information associated with the place. The user preference information associated with the place may further include a place in connection with a user taste (for example, a food taste (Chinese, Japanese, Korean, etc.) of the plurality of mobile communication terminals 100A, 100B, 100C, 100D, respectively, and hobby activity information (for example, golf, bowling, shopping, etc.).

The controller 212 may classify the user preference information according to POI categories. For example, the controller 212 may classify information associated with a department store as first POI information, classify information associated with a gas station as second POI information, classify information associated with a restaurant as third POI information, and classify information associated with a tourist attraction as fourth POI information among user preference information associated with the place.

The controller 212 may apply a weighted value corresponding to a use frequency of the information associated with the department store to the first POI information, apply a weighted value corresponding to a use frequency of the information associated with the gas station to the second POI information, apply a weighted value corresponding to a use frequency of the information associated with the restaurant to the third POI information, and apply a weighted value corresponding to a use frequency of the information associated with the tourist attraction to the fourth POI information among user preference information associated with the place. Accordingly, the first through the fourth POI information may have a different weighted value due to a user preference (taste) of the plurality of mobile communication terminals 100A, 100B, 100C, 100D, respectively.

The controller 212 may display user preference information associated with the place on the plurality of mobile communication terminals 100A, 100B, 100C, 100D as well as on the display unit 201.

When the mobile terminal 200 is mounted on the vehicle, the controller 212 detects recommendation POI information from a server (S23). For example, when the mobile terminal 200 is mounted on the vehicle, the controller 212 requests recommendation POI information contained within a predetermined radius from a current location to a server, and receives the recommendation POI information from the server. The predetermined radius may be changed by a user. The recommendation POI information detected from the server may be POI information recommended by a social network service (SNS) (for example, Facebook, KakaoTalk, Twitter, YouTube, etc.), a portal site, and the like.

The controller 212 detects representative POI information based on the user preference information and recommendation POI information associated with the place (S24). For example, the controller 212 detects POI information corresponding to the user preference information as the representative POI information. The representative POI information may include at least one or more POIs.

The controller 212 detects POI information corresponding to the user preference information among the recommendation POI information, and arrange the detected POI information according to a weighted value applied to the user preference information. For example, the controller 212 may detect POI information corresponding to the user preference information among the recommendation POI information, and arrange the detected POI information in the order from a high weighted value to a low weighted value applied to the user preference information.

The controller 212 may detects a user schedule from at least one or more of a user account's server, a mobile communication terminal 100, and a memory 213 (S25).

The controller 212 may detects representative POI information from the candidate POI information based on the detected user schedule (S26), and display the representative POI information on the display unit 201, and sets any one of the representative POI information as a destination according to a user's request. For example, the controller 212 detects a POI or the like corresponding to a place and/or a time contained in the detected user schedule from the candidate POI information as the representative POI information, and displays the detected representative POI information on the display unit 201. The representative POI information may be one or more POIs corresponding to at least one or more categories.

While the vehicle is being stopped, the controller 212 may display the representative POI information on the display unit 201.

The controller 212 may give a destination setting authority to any one of the plurality of mobile communication terminals 100A, 100B, 100C, 100D.

The controller 212 may share private driving data with the plurality of mobile communication terminals 100A, 100B, 100C, 100D.

The controller 212 may display the representative POI information on the plurality of mobile communication terminals 100A, 100B, 100C, 100D as well as on the display unit 201. The controller 212 may set a POI selected from the representative POI information displayed on the plurality of mobile communication terminals 100A, 100B, 100C, 100D as a stopover on a route from a current location to a destination. For example, the controller 212 may display the representative POI information on the display unit 201, and automatically set a POI selected from the representative POI information displayed on the plurality of mobile communication terminals 100A, 100B, 100C, 100D in a state that any one of the representative POI information is set to a destination according to a user's request as a stopover on a route from a current location to the destination.

The controller 212 may display the representative POI information on the display unit 201 and the plurality of mobile communication terminals 100A, 100B, 100C, 100D as well as display information (for example, department store opening hours, department store products information, restaurant opening hours, restaurant menus information, gas station oil prices, tourist attractions information, etc.) associated with the representative POI information (for example, department store, restaurant, gas station, tourist attraction, etc.) on the display unit 201 and the plurality of mobile communication terminals 100A, 100B, 100C, 100D.

The controller 212 may detect user preference scores for a plurality of POI information, respectively, generated by classifying the user preference information according to POI categories and a sum of user recommendation scores for the detected POI information as a POI recommendation level (POI recommendation score), and automatically set POI information having the highest POI recommendation score (recommendation level) among the plurality of POI information and the recommended POI information to a destination. The user preference score may be the same as the weighted value.

The controller 212 may update the detected schedule by writing the representative POI information on the detected schedule, and display the updated schedule on the display unit 201, and upload the updated schedule to the mobile communication terminal 100 and/or the server.

Hereinafter, a method of controlling a mobile terminal according to another embodiment of the present disclosure will be described.

Figure 18:
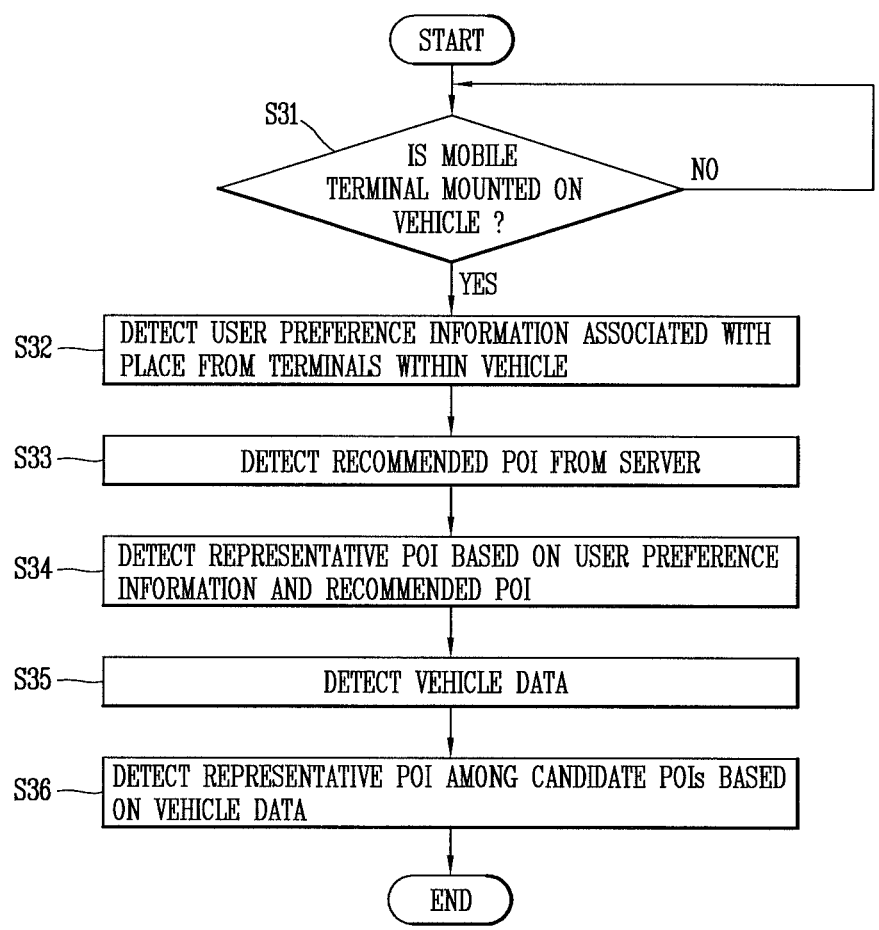
FIG. 18 is a flow chart illustrating a method of controlling a mobile terminal according to still another embodiment of the present disclosure.

FIG. 18 is a flow chart illustrating a method of controlling a mobile terminal according to still another embodiment of the present disclosure.

First, the controller 212 determines (judges) whether or not the mobile terminal 200 is mounted on the vehicle (S31). For example, when the mobile terminal 200 is connected to an electronic control unit (ECU) of the vehicle through a wired or wireless communication network within the vehicle, the controller 212 determines that the mobile terminal 200 is mounted on the vehicle (for example, a dashboard of the vehicle).

When the mobile terminal 200 is mounted on the vehicle, the controller 212 may display navigation data (map data) installed in the mobile terminal 200 on the display unit 201. When the mobile terminal 200 is mounted on the vehicle, the controller 212 forms a communication network with a plurality of mobile communication terminals 100A, 100B, 100C, 100D within the vehicle.

When the mobile terminal 200 is mounted on the vehicle, the controller 212 detects user preference information associated with a place from the plurality of mobile communication terminals 100A, 100B, 100C, 100D within the vehicle (S32). For example, the controller 212 detects a recent destination, a navigation or Internet search destination, a visiting place, a place (destination) registered with the Favorites on the Internet stored in a plurality of mobile communication terminals 100A, 100B, 100C, 100D, respectively, within the vehicle as user preference information associated with the place. The user preference information associated with the place may further include a place in connection with a user taste (for example, a food taste (Chinese, Japanese, Korean, etc.) of the plurality of mobile communication terminals 100A, 100B, 100C, 100D, respectively, and hobby activity information (for example, golf, bowling, shopping, etc.).

The controller 212 may classify the user preference information according to POI categories. For example, the controller 212 may classify information associated with a department store as first POI information, classify information associated with a gas station as second POI information, classify information associated with a restaurant as third POI information, and classify information associated with a tourist attraction as fourth POI information among user preference information associated with the place.

The controller 212 may apply a weighted value corresponding to a use frequency of the information associated with the department store to the first POI information, apply a weighted value corresponding to a use frequency of the information associated with the gas station to the second POI information, apply a weighted value corresponding to a use frequency of the information associated with the restaurant to the third POI information, and apply a weighted value corresponding to a use frequency of the information associated with the tourist attraction to the fourth POI information among user preference information associated with the place. Accordingly, the first through the fourth POI information may have a different weighted value due to a user preference (taste) of the plurality of mobile communication terminals 100A, 100B, 100C, 100D, respectively.

The controller 212 may display user preference information associated with the place on the plurality of mobile communication terminals 100A, 100B, 100C, 100D as well as on the display unit 201.

When the mobile terminal 200 is mounted on the vehicle, the controller 212 detects recommendation POI information from a server (S33). For example, when the mobile terminal 200 is mounted on the vehicle, the controller 212 requests recommendation POI information contained within a predetermined radius from a current location to a server, and receives the recommendation POI information from the server. The predetermined radius may be changed by a user. The recommendation POI information detected from the server may be POI information recommended by a social network service (SNS) (for example, Facebook, KakaoTalk, Twitter, YouTube, etc.), a portal site, and the like.

The controller 212 detects representative POI information based on the user preference information and recommendation POI information associated with the place (S34). For example, the controller 212 detects POI information corresponding to the user preference information as the representative POI information. The representative POI information may include at least one or more POIs.

The controller 212 detects POI information corresponding to the user preference information among the recommendation POI information, and arrange the detected POI information according to a weighted value applied to the user preference information. For example, the controller 212 may detect POI information corresponding to the user preference information among the recommendation POI information, and arrange the detected POI information in the order from a high weighted value to a low weighted value applied to the user preference information.

The controller 212 detects vehicle data from the vehicle (S35).

The controller 212 may detects representative POI information from the candidate POI information based on the detected vehicle data (S36), and display the representative POI information on the display unit 201, and sets any one of the representative POI information as a destination according to a user's request. For example, the controller 212 detects a POI or the like corresponding to a place and/or a time contained in the detected user schedule from the candidate POI information as the representative POI information, and displays the detected representative POI information on the display unit 201. The representative POI information may be one or more POIs corresponding to at least one or more categories.

While the vehicle is being stopped, the controller 212 may display the representative POI information on the display unit 201.

The controller 212 may give a destination setting authority to any one of the plurality of mobile communication terminals 100A, 100B, 100C, 100D.

The controller 212 may share private driving data with the plurality of mobile communication terminals 100A, 100B, 100C, 100D.

The controller 212 may display the representative POI information on the plurality of mobile communication terminals 100A, 100B, 100C, 100D as well as on the display unit 201. The controller 212 may set a POI selected from the representative POI information displayed on the plurality of mobile communication terminals 100A, 100B, 100C, 100D as a stopover on a route from a current location to a destination. For example, the controller 212 may display the representative POI information on the display unit 201, and automatically set a POI selected from the representative POI information displayed on the plurality of mobile communication terminals 100A, 100B, 100C, 100D in a state that any one of the representative POI information is set to a destination according to a user's request as a stopover on a route from a current location to the destination.

The controller 212 may display the representative POI information on the display unit 201 and the plurality of mobile communication terminals 100A, 100B, 100C, 100D as well as display information (for example, department store opening hours, department store products information, restaurant opening hours, restaurant menus information, gas station oil prices, tourist attractions information, etc.) associated with the representative POI information (for example, department store, restaurant, gas station, tourist attraction, etc.) on the display unit 201 and the plurality of mobile communication terminals 100A, 100B, 100C, 100D.

The controller 212 may detect user preference scores for a plurality of POI information, respectively, generated by classifying the user preference information according to POI categories and a sum of user recommendation scores for the detected POI information as a POI recommendation level (POI recommendation score), and automatically set POI information having the highest POI recommendation score (recommendation level) among the plurality of POI information and the recommended POI information to a destination. The user preference score may be the same as the weighted value.

The controller 212 may update the detected schedule by writing the representative POI information detected based on the vehicle data on the detected schedule, and display the updated schedule on the display unit 201, and upload the updated schedule to the mobile communication terminal 100 and/or the server.

Hereinafter, a method of recommending a POI based on the vehicle data, and writing information on the recommended POI on a schedule to update the schedule will be described with reference to FIG. 19.

FIG. 19 is an exemplary view illustrating a table for recommending POI based on vehicle data according to the embodiments of the present disclosure.

As illustrated in FIG. 19, when the detected vehicle data is vehicle error data (for example, engine status, tire air pressure, engine oil status, air conditioning status, coolant status, battery voltage, etc.) or vehicle periodic inspection data (for example, vehicle periodic inspection period, vehicle supplies replacement period, etc.), the controller 212 may search the nearest repair shop (POI) from a current location, and detect the searched repair shop (POI) as the representative POI, and provide the detected representative POI to the display unit 201 or register the representative POI (searched repair shop) for the user schedule to update the user schedule. Assuming that there exist a plurality of events on the schedule), the controller 212 may search an empty time between the plurality of events, and register the representative POI (searched repair shop) for the empty time) to update the user schedule.

When the detected vehicle data is a vehicle fuel status and/or a remaining fuel, the controller 212 may search a gas station (POI) within a distance of mileage with the remaining fuel, and detect the searched gas station (POI) as the representative POI, and provide the detected representative POI on the display unit 201 or register the representative POI (searched gas station) for the user schedule, thereby updating the user schedule.

When the searched vehicle data is car wash management data (for example, car wash visiting period, etc.), the controller 212 may search the nearest car wash (POI) from a current location, and detect the searched car wash (POI) as the representative POI, and provide the detected representative POI on the display unit 201 or register the representative POI (searched car wash) for the user schedule, thereby updating the user schedule.

Hereinafter, a method of recommending a POI based on the schedule data, and registering information on the recommended POI for a schedule to update the schedule will be described with reference to FIG. 20.

FIG. 20 is an exemplary view illustrating a table for recommending POI based on schedule data according to the embodiments of the present disclosure.

As illustrated in FIG. 20, when a first event of the detected user schedule is a meal time, the controller 212 may search the nearest restaurant (POI) from a place corresponding to the first event, and provide the searched restaurant (POI) on the display unit 201 or register the representative POI (restaurant) for the user schedule, thereby updating the user schedule.

When a second event of the detected user schedule is a specific place, the controller 212 may search the nearest parking lot (POI) from a place corresponding to the second event, and provide the searched parking lot (POI) on the display unit 201 or register the representative POI (parking lot) for the user schedule, thereby updating the user schedule.

The controller 212 may give a priority to the user schedule and the vehicle data, and provide the representative POI information detected based on the representative POI information or the user schedule detected based on the vehicle data according to the given priority. For example, when detecting representative POI information from the candidate POI information based on the user schedule and the vehicle data, the controller 212 may give a top priority to the vehicle data rather than the user schedule, thereby first recommending the representative POI information detected based on the vehicle data to a user, and then recommending the representative POI information detected based on the user schedule to the user.

Figure 21:
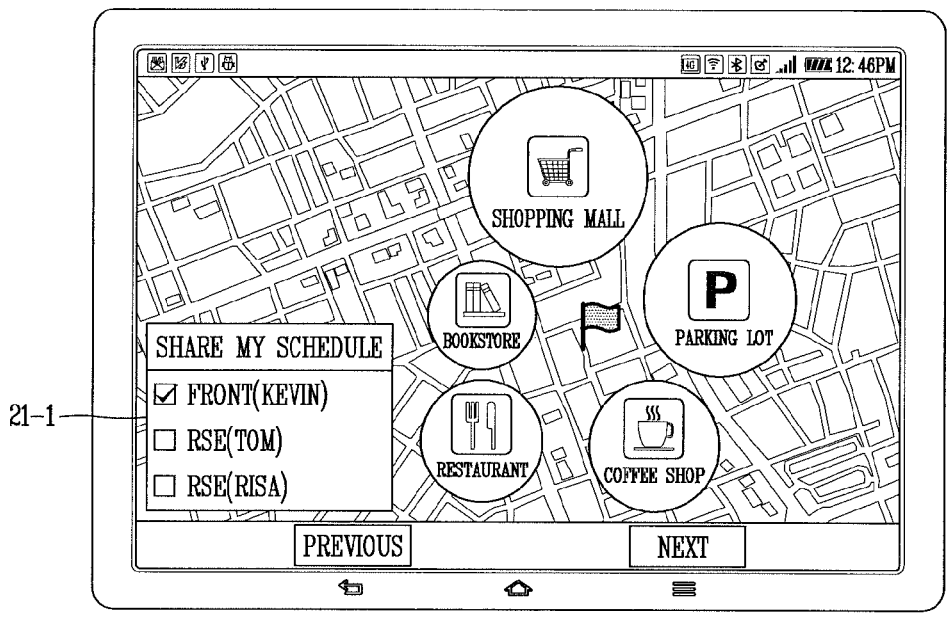
FIG. 21 is an exemplary view illustrating a method of sharing a schedule including POI information (representative POI information) according to an embodiment of the present disclosure.

FIG. 21 is an exemplary view illustrating a method of sharing a schedule including POI information (representative POI information) according to an embodiment of the present disclosure.

As illustrated in FIG. 21, when a share menu (or share icon) for sharing a user schedule including the representative POI information with a plurality of mobile communication terminals 100A, 100B, 100C, 100D within the vehicle is selected by a user, the controller 212 displays a window (for example, pop-up window) 21-1 for sharing a user schedule including the representative POI information on the map data. The representative POI information is displayed on the map data.

The window 21-1 for sharing a user schedule including the representative POI information may include a first check box for sharing the user schedule including the representative POI information with a first mobile communication terminal (for example, a terminal of the passenger's seat) within the vehicle, and a second and a third check box for sharing the user schedule including the representative POI information with a second and a third mobile communication terminal (for example, a terminal (RSE) of the driver's rear seat and a terminal (RSE) of the rear passenger's seat) within the vehicle.

When the first check box is checked by a user, the controller 212 provide the user schedule including the representative POI information to a first mobile communication terminal (for example, a terminal of the passenger's seat) within the vehicle to share the user schedule including the representative POI information with the first mobile communication terminal (for example, a terminal of the passenger's seat) within the vehicle.

When the second check box is checked by a user, the controller 212 provide the user schedule including the representative POI information to a second mobile communication terminal (for example, a terminal (RSE) of the driver's rear seat) within the vehicle to share the user schedule including the representative POI information with the second mobile communication terminal within the vehicle.

When the third check box is checked by a user, the controller 212 provide the user schedule including the representative POI information to a third mobile communication terminal (for example, a terminal (RSE) of the passenger's rear seat) within the vehicle to share the user schedule including the representative POI information with the third mobile communication terminal within the vehicle.

Figure 22:
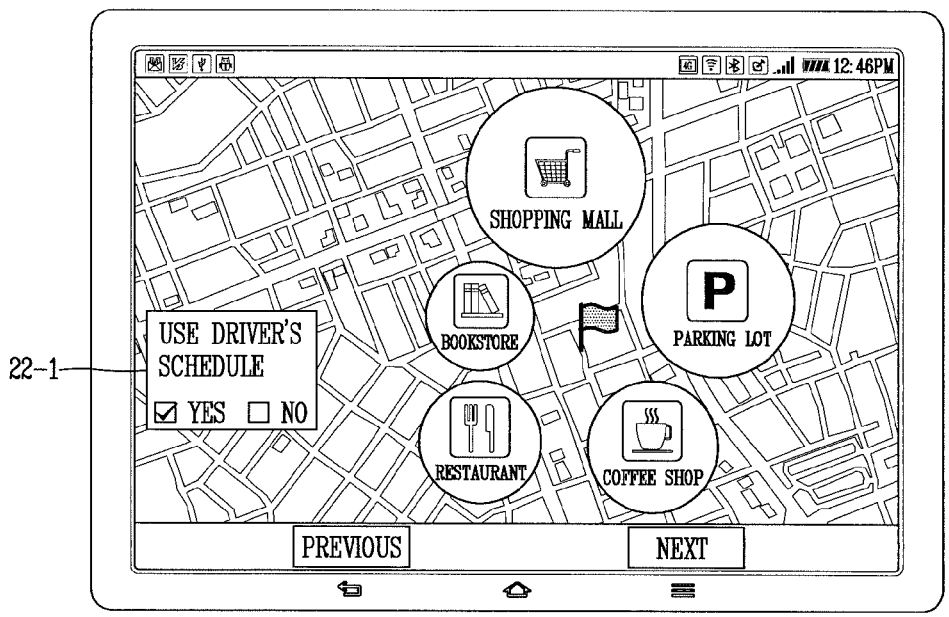
FIG. 22 is an exemplary view illustrating another method of sharing a schedule including POI information (representative POI information) according to an embodiment of the present disclosure.

FIG. 22 is an exemplary view illustrating another method of sharing a schedule including POI information (representative POI information) according to an embodiment of the present disclosure.

As illustrated in FIG. 22, when a user schedule including the representative POI information is received, the first mobile communication terminal (for example, a terminal of the passenger's seat) within the vehicle may display a window 22-1 for asking whether or not to use the user schedule including the representative POI information on the display unit of the first mobile communication terminal (for example, a terminal of the passenger's seat) within the vehicle. In other words, the user schedule including the representative POI information may be displayed on the display unit of the first mobile communication terminal (for example, a terminal of the passenger's seat) within the vehicle according to a user input of the first mobile communication terminal (for example, a terminal of the passenger's seat) within the vehicle.

Figure 23:
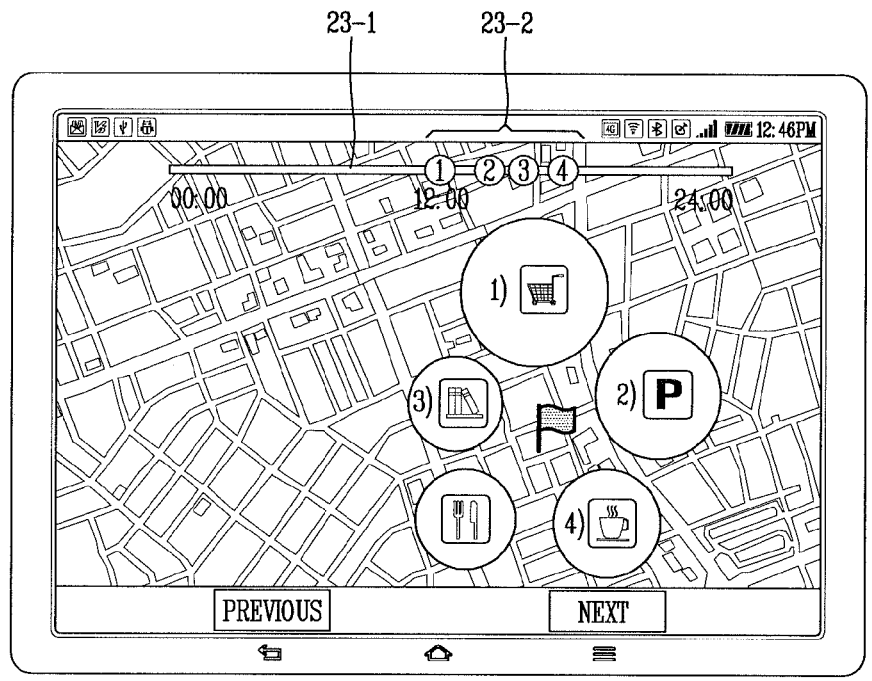
FIG. 23 is an exemplary view illustrating a time line indicating a schedule containing POI information (representative POI information) along with map data according to an embodiment of the present disclosure.

FIG. 23 is an exemplary view illustrating a time line indicating a schedule containing POI information (representative POI information) along with map data according to an embodiment of the present disclosure.

As illustrated in FIG. 23, the controller 212 displays the representative POI information on map data, and displays a time line 23-1 in an adjoining region of the map data, and displays icons 23-2 indicating the user schedule including the representative POI information on the time line 23-1 according to a time sequence. Accordingly, the user may check a user schedule based on icons 23-2 indicating the user schedule including the representative POI information on the time line 23-1 in an easy and fast manner.

The controller 212 may display a number according to a user schedule time on representative POI information (representative POI icons) displayed on the map data, and display the number displayed according to the user schedule time on icons 23-2 indicating the user schedule, thereby allowing the user to intuitively check a user schedule order by viewing a number displayed on the icons 23-2 indicating the user schedule and/or the representative POI information (representative POI icons).

Figure 24:
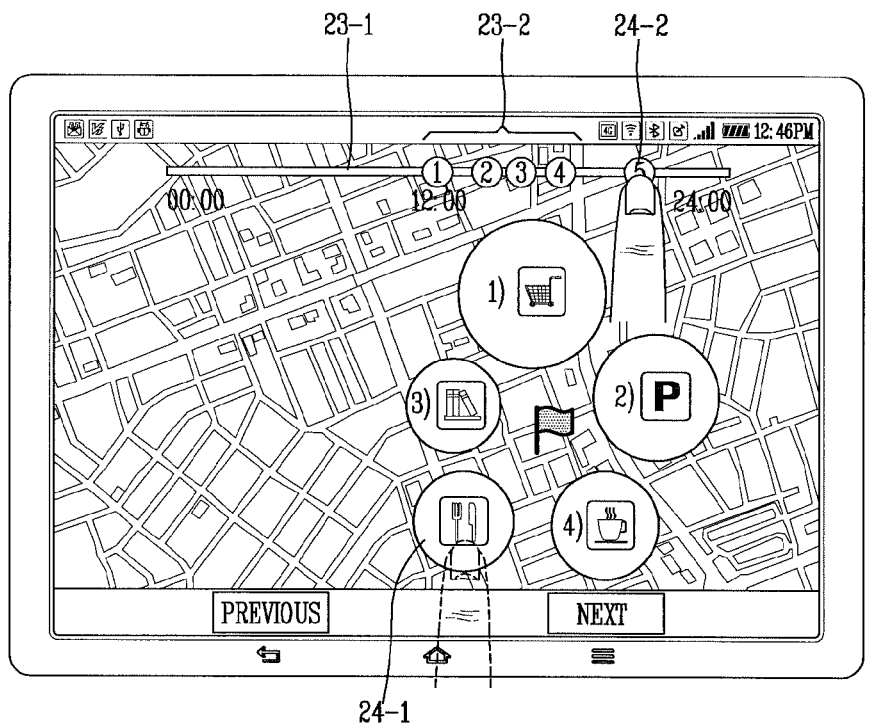
FIG. 24 is an exemplary view illustrating a method of registering POI information for a user schedule according to an embodiment of the present disclosure.

FIG. 24 is an exemplary view illustrating a method of registering POI information for a user schedule according to an embodiment of the present disclosure.

As illustrated in FIG. 24, the controller 212 displays the representative POI information (POI icon) and adjoining POI information (POI icon) on map data, and displays a time line 23-1 in an adjoining region of the map data, and displays icons 23-2 indicating a user schedule including the representative POI information on the time line 23-1 according to a time sequence. When a first POI icon 24-1 moves into a first time region 24-2 of the time line by a user's drag-and-drop (user input) among a plurality of POI icons displayed on the map data, the controller 212 registers POI information corresponding to the first POI icon 24-1 for a time corresponding to the first time region on the user schedule, and displays an icon indicating schedule information corresponding to the first POI icon 24-1 on the first time region 24-2 of the time line.

Figure 25:
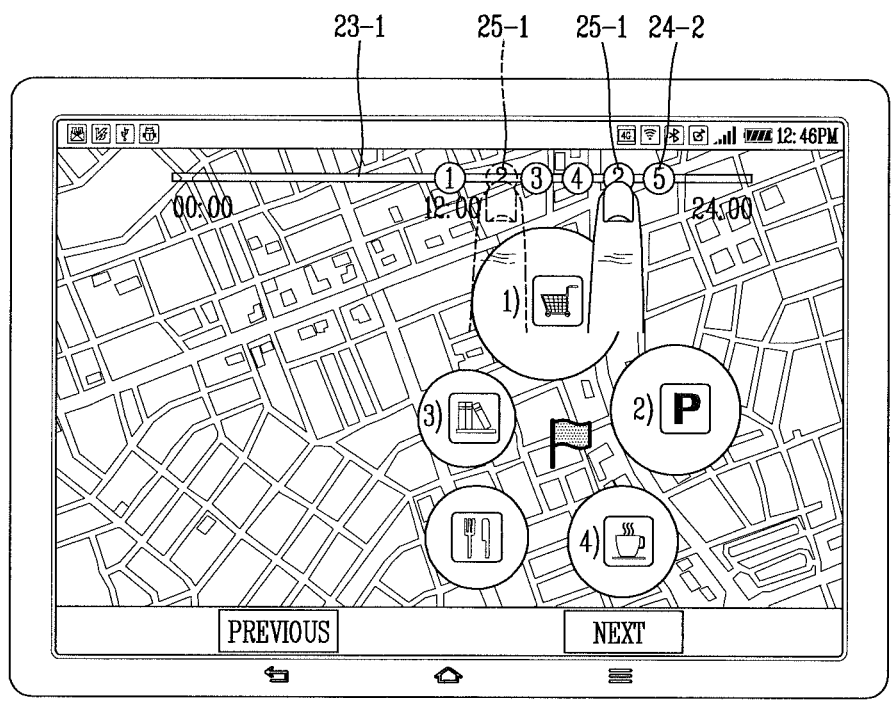
FIG. 25 is an exemplary view illustrating a method of editing a user schedule according to an embodiment of the present disclosure.

FIG. 25 is an exemplary view illustrating a method of editing a user schedule according to an embodiment of the present disclosure.

As illustrated in FIG. 25, the controller 212 displays the representative POI information (POI icon) and adjoining POI information (POI icon) on map data, and displays a time line 23-1 in an adjoining region of the map data, and displays icons 23-2 indicating a user schedule including the representative POI information on the time line 23-1 according to a time sequence.

When a second icon 25-1 among a first through a fifth icon indicating a user schedule sequentially displayed on the time line 23-1 moves into a specific time region between the fourth icon and the fifth icon by a user's drag-and-drop (user input), the controller 212 changes a time for the user schedule corresponding to the second icon 25-1 to the specific time region. In other words, The user may move only the first through the fifth icon to change the user schedule in an easy and fast manner.

As described in detail in the above, a mobile terminal and a control method according to an embodiment of the present disclosure may automatically switch the mode of the mobile terminal to a vehicle mode when a user carries the mobile terminal and then mounts it on a vehicle, thereby allowing the user to check the vehicle mode in an easy and fast manner.

A mobile terminal and a control method according to an embodiment of the present disclosure may automatically switch the mode of the mobile terminal to a vehicle mode, and recommend representative POI information based on user preferences of vehicle occupants, to recommended POI information of a server when a user carries the mobile terminal and then mounts it on a vehicle, vehicle data and user schedules, thereby providing POI information suitable to user environments.

It will be apparent to those skilled in this art that various changes and modifications may be made thereto without departing from the gist of the present invention. Accordingly, it should be noted that the embodiments disclosed in the present invention are only illustrative and not limitative to the concept of the present invention, and the scope of the concept of the invention is not limited by those embodiments. The scope protected by the present invention should be construed by the accompanying claims, and all the concept within the equivalent scope of the invention should be construed to be included in the scope of the right of the present invention.

What is claimed is:

1. A mobile terminal, comprising:
 a communication unit configured to connect to a communication network with a plurality of communication terminals within a vehicle based on the mobile terminal being mounted to the vehicle;
 a display unit configured to display map data; and
 a controller configured to:
  access, from the plurality of communication terminals, user preference information associated with preference for one or more places by one or more users associated with the plurality of communication terminals,
  access, from a server and through the communication unit, point of interest (POI) information,
  determine candidate POI information based on the accessed POI information and the accessed user preference information, the candidate POI information being a subset of the accessed POI information,
  access user schedule information associated with schedule for the one or more users associated with the plurality of communication terminals,
  detect, from the candidate POI information, representative POI information based on the accessed user schedule information, the representative POI information being a subset of the candidate POI information, and
  display, on the map data, the representative POI information.

2. The mobile terminal of claim 1, wherein the controller is configured to register the representative POI information to a user schedule of at least one of the one or more users associated with the plurality of communication terminals to update the user schedule to include the representative POI information, and at least one of display, on the display unit, the updated user schedule or register, with the server, the updated user schedule.

3. The mobile terminal of claim 1, wherein the controller is configured to access vehicle data for the vehicle and detect, from the candidate POI information, the representative POI information based on the accessed vehicle data.

4. The mobile terminal of claim 3, wherein the controller is configured to register the representative POI information to a user schedule of at least one of the one or more users associated with the plurality of communication terminals based on the accessed vehicle data to update the user schedule.

5. The mobile terminal of claim 3, wherein the controller is configured to assign priority to the user schedule information and the vehicle data, provide the representative POI information based on the vehicle data according to the assigned priority indicating that the vehicle data is prioritized over the user schedule information, and provide the representative POI information based on the user schedule information according to the assigned priority indicating that the user schedule information is prioritized over the vehicle data.

6. The mobile terminal of claim 1, wherein the controller is configured to access user preference scores for a plurality of POI information, respectively, the user preference scores having been generated by classifying the user preference information according to POI categories and evaluating user recommendation scores for the accessed POI information as a POI recommendation level, and automatically set, as a destination, POI information having a highest POI recommendation level among the plurality of POI information and the accessed POI information.

7. The mobile terminal of claim 1, wherein the controller is configured to identify POI information corresponding to the user preference information among the accessed POI information, and arrange the identified POI information according to a weighted value applied to the user preference information.

8. The mobile terminal of claim 3, wherein the vehicle data comprises air conditioner information of a vehicle, engine oil level information, engine temperature information, tire air pressure information, battery information, radio channel setting information, current vehicle speed information of the vehicle, RPM (revolution per minute) information of the vehicle, steering angle information of the vehicle, and brake operation information of the vehicle.

9. The mobile terminal of claim 1, wherein the preference information comprises preference information stored in at least one of the plurality of communication terminals including a recent destination, a navigation or Internet search destination, and a place registered as a favorite.

10. The mobile terminal of claim 6, wherein the controller is configured to:
    detect that the vehicle is stopped,
    based on detection that the vehicle is stopped, display, at relevant positions of the map data, icons indicating POI information according to the POI recommendation level,
    detect that the vehicle is moving, and
    based on detection that the vehicle is moving, display icons indicating the POI information at one or more of a left side, a right side, a top, and a bottom of the map data.

11. The mobile terminal of claim 10, wherein the controller is configured to:
    detect that the vehicle is moving, and based on detection that the vehicle is moving, display icons indicating the POI information at one or more of a left side, a right side, a top, and a bottom of the map data in areas outside of display of a route from a current location to a destination.

12. The mobile terminal of claim 11, wherein the controller is configured to display, on at least one of the plurality of communication terminals, the representative POI information, and automatically set, as a destination, a POI selected from the representative POI information displayed on the plurality of communication terminals according to a user's request for a stopover on a route from a current location to the destination.

13. The mobile terminal of claim 4, wherein the controller is configured to display a time line in an adjoining region of the map data, and display icons indicating the user schedule including the representative POI information on the time line according to a time sequence.

14. The mobile terminal of claim 13, wherein the controller is configured to determine that a first POI icon among the plurality of POI icons displayed on the map data has moved into a first time region of the time line by a user input, and, based on the determination that the first POI icon has moved into the first time region of the time line, register, on the user schedule, POI information corresponding to the first POI icon for a time corresponding to the first time region.

15. The mobile terminal of claim 13, wherein the controller is configured to determine that a first icon displayed in the first time region of the time line among icons indicating the user schedule displayed in a sequence on the time line has moved into a second time region of the time line, and, based on the determination that the first icon has moved into the second time region of the time line, change a time for the user schedule corresponding to the first icon to the second time region.

16. The mobile terminal of claim 10, wherein the controller is configured to display an icon indicating POI information having a higher POI recommendation level among the icons in a size larger than that of an icon indicating POI information having a lower POI recommendation level.

17. The mobile terminal of claim 10, wherein the controller is configured to display backgrounds of icons indicating POI information with different colors according to the POI recommendation level.

18. The mobile terminal of claim 10, wherein the controller is configured to set varying degrees of sharpness or transparency of icons indicating POI information according to the POI recommendation level.

19. The mobile terminal of claim 12, wherein information associated with the selected POI information comprises a cloud user rating for the relevant POI.

20. A mobile terminal, comprising:
    a display unit configured to concurrently display map data and a time line; and
    a controller configured to:
        access a user schedule,
        access POI information,
        determine a time sequence for the POI information based on the user schedule, and
        based on determination of the time sequence for the accessed POI information, display, on the time line and in the determined time sequence, icons indicating the user schedule including the POI information.

21. The mobile terminal of claim 20, wherein the controller is configured to determine that a first POI icon among a plurality of POI icons displayed on the map data has moved into a first time region of the time line by a user input, and, based on the determination that the first POI icon has moved into the first time region of the time line, register POI information corresponding to the first POI icon for a time corresponding to the first time region on the user schedule.

* * * * *